(12) United States Patent
Shen et al.

(10) Patent No.: US 11,691,846 B2
(45) Date of Patent: Jul. 4, 2023

(54) HOISTING CONTAINER POSE CONTROL METHOD OF DOUBLE-ROPE WINDING TYPE ULTRA-DEEP VERTICAL SHAFT HOISTING SYSTEM

(71) Applicant: China University of Mining and Technology, Jiangsu (CN)

(72) Inventors: Gang Shen, Jiangsu (CN); Zhencai Zhu, Jiangsu (CN); Xiang Li, Jiangsu (CN); Yu Tang, Jiangsu (CN); Guohua Cao, Jiangsu (CN); Gongbo Zhou, Jiangsu (CN); Songyong Liu, Jiangsu (CN); Yuxing Peng, Jiangsu (CN); Hao Lu, Jiangsu (CN)

(73) Assignee: China University of Mining and Technology, Jiangsu (CN)

(*) Notice: Subject to any disclaimer, the term of this patent is extended or adjusted under 35 U.S.C. 154(b) by 0 days.

(21) Appl. No.: 16/772,162

(22) PCT Filed: Sep. 12, 2019

(86) PCT No.: PCT/CN2019/105589
§ 371 (c)(1),
(2) Date: Jun. 12, 2020

(87) PCT Pub. No.: WO2020/206931
PCT Pub. Date: Oct. 15, 2020

(65) Prior Publication Data
US 2021/0070586 A1    Mar. 11, 2021

(30) Foreign Application Priority Data
Apr. 10, 2019 (CN) .......................... 201910284619.2

(51) Int. Cl.
*B66B 1/28* (2006.01)
*G06F 30/23* (2020.01)
(Continued)

(52) U.S. Cl.
CPC ............. *B66B 1/28* (2013.01); *B66B 19/00* (2013.01); *F15B 15/00* (2013.01); *G05B 13/042* (2013.01); *G06F 30/23* (2020.01); *G06F 2111/10* (2020.01)

(58) Field of Classification Search
CPC . B66B 1/28; B66B 19/00; G06F 30/23; G06F 2111/10; F15B 15/00; G05B 13/042
(Continued)

(56) References Cited

U.S. PATENT DOCUMENTS

2017/0305722 A1    10/2017  Zhu et al.

FOREIGN PATENT DOCUMENTS

| CN | 102602838 | 7/2012 |
| CN | 104035334 | 9/2014 |

(Continued)

OTHER PUBLICATIONS

Zhu_2017 (Wire Rope Tension Control of Hoisting System Using a Robust Nonlinear Adaptive Back stepping Control Scheme, ISA Transactions 72 (2018) 256-272 available online 2017) (Year: 2017).*

(Continued)

*Primary Examiner* — Brian S Cook
(74) *Attorney, Agent, or Firm* — JCIPRNET

(57) ABSTRACT

The present invention discloses a hoisting container pose control method of a double-rope winding type ultra-deep vertical shaft hoisting system. The method comprises the following steps of step 1, building a mathematical model of a double-rope winding type ultra-deep vertical shaft hoisting subsystem; step 2, building a position closed-loop mathematical model of an electrohydraulic servo subsystem; step 3, outputting a flatness characteristics of a nonlinear system; step 4, designing a pose leveling flatness controller of a double-rope winding type ultra-deep vertical shaft hoisting (Continued)

subsystem; and step 5, designing a position closed-loop flatness controller of the electrohydraulic servo subsystem.

9 Claims, 9 Drawing Sheets

(51) Int. Cl.
*B66B 19/00* (2006.01)
*F15B 15/00* (2006.01)
*G05B 13/04* (2006.01)
*G06F 111/10* (2020.01)

(58) Field of Classification Search
USPC .......................................................... 703/2
See application file for complete search history.

(56) References Cited

FOREIGN PATENT DOCUMENTS

| | | |
|---|---|---|
| CN | 104444707 | 3/2015 |
| CN | 104763694 | 7/2015 |
| CN | 109334380 | 2/2019 |
| CN | 110145501 | 8/2019 |
| JP | 2011101938 | 5/2011 |

OTHER PUBLICATIONS

Kim_2015 (Flatness-Based Nonlinear Control for Position Tracking of Electrohydraulic Systems, IEEE/ASME Transactions on Mechatronics, vol. 20, No. 1 Feb. 2015). (Year: 2015).*

"International Search Report (Form PCT/ISA/210) of PCT/CN2019/105589," dated Jan. 15, 2020, pp. 1-5.

* cited by examiner

HOISTING CONTAINER POSE CONTROL METHOD OF DOUBLE-ROPE WINDING TYPE ULTRA-DEEP VERTICAL SHAFT HOISTING SYSTEM

CROSS-REFERENCE TO RELATED APPLICATION

This application is a 371 of international application of PCT application serial no. PCT/CN2019/105589, filed on Sep. 12, 2019, which claims the priority benefit of China application no. 201910284619.2, filed on Apr. 10, 2019. The entirety of each of the above mentioned patent applications is hereby incorporated by reference herein and made a part of this specification.

FIELD OF THE INVENTION

The present invention relates to a vertical shaft hoisting system, in particular to a hoisting container pose control method of a double-rope winding type ultra-deep vertical shaft hoisting system, and belongs to the technical field of mine hoisting.

DESCRIPTION OF RELATED ART

An ultra-deep vertical shaft hoisting system is a vertical shaft hoisting system with a mining depth greater than 1500 m. Due to the great mining depth of the ultra-deep vertical shaft hoisting system, a common rigid hoisting container cage guide is prone to generate damage phenomena such as deformation of a cage guide in a shaft, damage to a cage guide beam, looseness of a beam socket and operation instability under conditions of high-speed and heavy-load operation of a hoisting container, so that the common rigid hoisting container cage guide cannot be used for ultra-deep vertical shaft hoisting. However, when a flexible cage guide is used for hoisting, factors of manufacturing differences of diameters of winding drums, installation differences of two steel wire ropes, elastic modulus inconsistency of the two steel wire ropes, etc. may cause asynchronism of tail end movement of the two steel wire ropes of the hoisting system, so that inclination of the hoisting container is caused, and tension inconsistency of the two steel wire ropes is further caused. When the steel wire ropes operate under such conditions for a long time, a condition that the stress of one steel wire rope exceeds its safe use stress is easily caused, so that major malignant accidents of rope fracture is caused. In order to avoid such accidents, an angle of the hoisting container needs to be actively regulated, so that the hoisting container keeps a balanced state, and the tension of the two steel wire ropes keeps consistent.

A backstepping controller design method is commonly used in the prior art, but such a control method needs to perform variable derivation on system state variables, and a design process of a controller is complicated. Additionally, when the controller is applied to a practical system of an ultra-deep vertical shaft, since the ultra-deep vertical shaft hoisting system is a complicated multi-structure mechanical-electrical-hydraulic system, even though many practical factors are considered in a modeling process, it is difficult to realize consistency with the practical system. Therefore, in the design process of the controller, the derivation on the system state variables will undoubtedly amplify sensor measurement noise and system non-modeling characteristics, and cause greater tracking errors and longer leveling response time.

SUMMARY OF THE INVENTION

In order to overcome various defects in the prior art, the present invention provides a hoisting container pose control method of a double-rope winding type ultra-deep vertical shaft hoisting system. A design process is simple. Control performance is good. Fast response may be given to a leveling hoisting system. Tracking errors are small.

In order to achieve the invention objectives, the present invention provides the hoisting container pose control method of the double-rope winding type ultra-deep vertical shaft hoisting system. The method includes following steps:

step 1, building a mathematical model of a double-rope winding type ultra-deep vertical shaft hoisting subsystem;

step 2, building a position closed-loop mathematical model of an electrohydraulic servo subsystem;

step 3, outputting flatness characteristics of a nonlinear system;

step 4, designing a flatness controller of a double-rope winding type ultra-deep vertical shaft hoisting subsystem; and step 5, designing a position closed-loop flatness controller of the electrohydraulic servo subsystem.

Further, the mathematical model of the double-rope winding type ultra-deep vertical shaft hoisting subsystem in step 1 is as follows:

1) Parameters used in a modeling process are defined:

$l_{ri}$ (i=1,2) is a winding length of a duplex winding drum;

$l_{ci}$ (i=1,2) is a length of two string ropes in a process of hoisting or descending a hoisting container;

$l_{hi}$ (i=1,2) is a length of two vertical section steel wire ropes in the process of hoisting or descending the hoisting container;

$u_i$ (i=1,2) is displacement of two floating hoisting sheaves;

$\varphi_i$ is an included angle between the two string ropes and a horizontal plane;

$a_i$ (i=1,2) is a horizontal distance between a connecting point of the two vertical section steel wire ropes on the hoisting container and a gravity center of the hoisting container;

$b_i$ (i=1,2) is a vertical distance between upper and lower surfaces of the hoisting container and the gravity center of the hoisting container;

$k_{si}$ (i=1,2,3,4) is a transverse equivalent stiffness of four pairs of spring-damping models; and $c_{si}$ (i=1,2,3,4) is a transverse equivalent damping coefficient of the four pairs of spring-damping models.

2) A hoisting process is defined as a positive direction, and in the process of hoisting or descending the hoisting container, the lengths of the two vertical section steel wire ropes 5 are shown as follows:

$$l_{h1} = l_{h10} - l_{r1} - u_1 \sin(\varphi_1) \quad (1); \text{ and}$$

$$l_{h2} = l_{h20} - l_{r2} - u_2 \sin(\varphi_2) \quad (2), \text{ wherein}$$

$l_{h10}$ and $l_{h20}$ are initial lengths of the two vertical section steel wire ropes.

3) A hoisting subsystem generalized vector $q=[x_c, y_c, \theta]$ is defined, wherein $x_c$ and $y_c$ are respectively vertical displacement and horizontal displacement of the gravity center of the hoisting container 6, $\theta$ is an anticlockwise rotation angle of the hoisting container 6, and a Lagrange's dynamical equation of the hoisting subsystem is shown as follows:

$$\frac{d}{dt}\left(\frac{\partial T}{\partial \dot{q}}\right) - \frac{\partial T}{\partial q} + \frac{\partial D}{\partial \dot{q}} + \frac{\partial U}{\partial q} = Q, \quad (3)$$

wherein

T, U and D are respectively the kinetic energy, potential energy and Rayleigh's dissipation function of the hoisting system, and Q is a hoisting subsystem nonpotential generalized force not including damping.

4) Tangential point displacement between the floating hoisting sheave and the left string rope is $l_{r1}+u_1(1+\sin \varphi_1)$, and tangential point displacement between the floating hoisting sheave and the left vertical section steel wire rope is $l_{r1}+u_1(1+\sin \varphi_1)$.

Displacement of the left string rope in a position of s unit length distance is shown as follows:

$$s_D = l_{r1} + (l_{r1} - \mu_1 \sin\phi_1 - l_{r1})\frac{s}{l_{r1}}. \quad (4)$$

Similarly, displacement of the left vertical section rope in a position of y unit length distance is shown as follows:

$$y_{l1} = l_{r1} + (1 + \sin\varphi_1)u_1 + [(x_c - a_1\theta_c) - l_{r1} - (1 + \sin\varphi_1)u_1]\frac{y}{l_{h1}}. \quad (5)$$

5) According to formulas (4) and (5), kinetic energy formulas of the left string rope and the left vertical section steel wire rope are respectively shown as follows:

$$T_{lc1} = \frac{1}{2}\rho \int_0^{l_{c1}} \dot{s}_{l1}^2 ds \quad (6)$$

$$= \frac{1}{2}\rho \int_0^{l_{c1}} \left[\dot{l}_{r1} + (\dot{l}_{r1} - \dot{u}_1\sin\varphi_1 - \dot{l}_{r1})\frac{s}{l_{c1}}\right]^2 ds$$

$$= \frac{1}{6}\rho l_{c1}\left[\dot{l}_{r1}^2 + \dot{l}_{r1}(\dot{l}_{r1} - \dot{u}_1\sin\varphi_1) + (\dot{l}_{r1} - \dot{u}_1\sin\varphi_1)^2\right]$$

and $$T_{lh1} = \frac{1}{2}\rho \int_0^{l_{h1}} \dot{y}_{l1}^2 dy \quad (7)$$

$$= \frac{1}{2}\rho \int_0^{l_{h1}} \{\dot{l}_{r1} + (1 + \sin\alpha_1)\dot{u}_1 +$$

$$[(\dot{x}_c - \varphi_1\dot{\theta}_c) - \dot{l}_{r1} - (1 + \sin\varphi_1)\dot{u}_1]\frac{y}{l_{h1}}\}^2 dy$$

$$= \frac{1}{6}\rho l_{h1}\{[\dot{l}_{r1} + (1 + \sin\varphi_1)\dot{u}_1]^2 + (\dot{x}_c - a_1\dot{\theta}_c)$$

$$[\dot{l}_{r1} + (1 + \sin\varphi_1)\dot{u}_1] + (\dot{x}_c - a_1\dot{\theta}_c)^2\}$$

wherein wherein in the formulas, $\rho$ is unit mass of the steel wire rope.

6) Tangential point displacement between the floating hoisting sheave and the right string rope is $l_{r2}-u_2 \sin \varphi_2$, and displacement of the right string rope in the position of the s unit length distance is shown as follows:

$$s_{l2} = l_{r2} + (l_{r2} - u_2\sin\varphi_2 - l_{r2})\frac{s}{l_{h1}}. \quad (8)$$

Tangential point displacement between the floating hoisting sheave and the right vertical section steel wire rope is $l_{r2}+u_2(1+\sin \varphi_2)$, and displacement of the right vertical section rope in the position of the y unit length distance is shown as follows:

$$y_{l2} = l_{r2} + (1 + \sin\varphi_2)u_2 + [(x_c - a_2\theta_c) - l_{r2} - (1 + \sin\varphi_2)u_2]\frac{y}{l_{h2}}. \quad (9)$$

7) According to formulas (8) and (9), kinetic energy formulas of the right string rope and the right vertical section steel wire rope are respectively shown as follows:

$$T_{lc2} = \frac{1}{2}\rho \int_0^{l_{c2}} \dot{s}_l^2 ds \quad (10)$$

$$= \frac{1}{2}\rho \int_0^{l_{c2}} \left[\dot{l}_{r2} + (\dot{l}_{r2} - \dot{u}_2\sin\varphi_2 - \dot{l}_{r2})\frac{s}{l_{c2}}\right]^2 ds$$

$$= \frac{1}{6}\rho l_{c2}\left[\dot{l}_{r2}^2 + \dot{l}_{r2}(\dot{l}_{r2} - \dot{u}_2\sin\varphi_2) + (\dot{l}_{r2} - \dot{u}_2\sin\varphi_2)^2\right]$$

and $$T_{lh2} = \frac{1}{2}\rho \int_0^{l_{h2}} \dot{y}^{2l} dy \quad (11)$$

$$= \frac{1}{2}\rho \int_0^{l_{h2}} \{\dot{l}_{r2} + (1 + \sin\varphi_2)\dot{u}_2 +$$

$$[(\dot{x}_c + a_2\dot{\theta}_c) - \dot{l}_{r2} - (1 + \sin\varphi_2)\dot{u}_2]\frac{y}{l_{h2}}\}^2 dy$$

$$= \frac{1}{6}\rho l_{h2}\{[\dot{l}_{r2} + (1 + \sin\varphi_2)\dot{u}_2]^2 + (\dot{x}_c + a_2\dot{\theta}_c)$$

$$[\dot{l}_{r2} + (1 + \sin\varphi_2)\dot{u}_2] + (\dot{x}_c - a_2\dot{\theta}_c)^2\}$$

8) Kinetic energy formulas of the left and right floating hoisting sheaves are shown as follows:

$$T_{h1} = \frac{1}{2}m_1\dot{u}_1^2 + \frac{1}{2}I_1\left(\frac{\dot{l}_{r1}}{r_1}\right)^2, \text{ and} \quad (12)$$

$$T_{h2} = \frac{1}{2}m_2\dot{u}_2^2 + \frac{1}{2}I_2\left(\frac{\dot{l}_{r2}}{r_2}\right)^2, \quad (13)$$

in the formulas, $m_1$ and $m_2$ are respectively masses of the left and right floating hoisting sheaves, $r_1$ and $r_2$ are respectively radii of the left and right floating hoisting sheaves, and $I_1$ and $I_2$ are respectively rotational inertias of the left and right floating hoisting sheaves.

A kinetic energy formula of the hoisting container is shown as follows:

$$T_c = \frac{1}{2}m_c\dot{x}_c^2 + \frac{1}{2}m_c\dot{y}_c^2 + \frac{1}{2}I_c\dot{\theta}_c^2 \quad (14), \text{ wherein}$$

in the formula, $m_c$ is a mass of the hoisting container, and $I_c$ is a rotational inertia of the hoisting container.

9) A potential energy formula of the left steel wire rope is shown as follows:

$$U_{i1} = \frac{1}{2}\rho g l_{h1}[x_c - \alpha_1\theta_c) + l_{r1} + (1+\sin \varphi_1)u_1] - \frac{1}{2}\rho g l_{c1}(l_{r1} + u_1 \sin \varphi_1 + l_{r1})\sin \varphi_1 + \frac{1}{2}k_{c1}(l_{r1} - u_1 \sin \varphi_1 - l_{r1})^2 + \frac{1}{2}k_{h1}[(x_c - \alpha_1\theta_c) - l_{r1} - (1+\sin \varphi_1)u_1]^2 \quad (15); \text{ and}$$

a potential energy formula of the right steel wire rope is shown as follows:

$$U_{i2} = \frac{1}{2}\rho g l_{h2}[x_c - \alpha_2\theta_c) + l_{r2} + (1+\sin \varphi_2)u_2] - \frac{1}{2}\rho g l_{c2}(l_{r2} + u_2 \sin \varphi_2 + l_{r2})\sin \varphi_2 + \frac{1}{2}k_{c2}(l_{r2} - u_2 \sin \varphi_2 - l_{r2})^2 + \frac{1}{2}k_{h2}[(x_c - \alpha_2\theta_c) - l_{r2} - (1+\sin \varphi_2)u_2]^2 \quad (16); \text{ wherein}$$

in the formulas, $k_{c1}$ and $k_{h1}$ are respectively stiffness of the left string rope and the left vertical section steel wire rope, and $k_{c2}$ and $k_{h2}$ are respectively stiffness of the right string rope and the right vertical section steel wire rope.

Potential energy formulas of the left and right floating hoisting sheaves are respectively shown as follows:

$$U_{h1} = m_1 g u_1 \quad (17), \text{ and}$$

$$U_{h2} = m_2 g u_2 \quad (18).$$

Potential energy of the hoisting container system includes the potential energy of the hoisting container and the potential energy of a flexible cage guide, and a formula is shown as follows:

$$U_c = m_c g x_c + \tfrac{1}{2} k_{s1}(y_c - b_1 \theta_c)^2 + \tfrac{1}{2} k_{s2}(\gamma_c + b_2 \theta_c)^2 + \tfrac{1}{2} k_{s3}(\gamma_c - b_1 \theta_c)^2 + \tfrac{1}{2} k_{s4}(\gamma_c + b_2 \theta_c)^2 \quad (19).$$

10) Rayleigh's dissipation energy formulas of left and right ropes are respectively shown as follows:

$$D_{l1} = \tfrac{1}{2} c_{c1}(\dot{i}_{r1} - \dot{u}_1 \sin \varphi_1 - \dot{i}_{r1})^2 + \tfrac{1}{2} c_{h1}[\dot{x}_c - a_1 \dot{\theta}_c) - \dot{i}_{r1} - (1 + \sin \varphi_1) \dot{u}_1]^2 \quad (20); \text{ and}$$

$$D_{l2} = \tfrac{1}{2} c_{c2}(\dot{l}_{r2} - \dot{u}_2 \sin \varphi_2 - \dot{i}_{r12})^2 + \tfrac{1}{2} c_{h2}[(\dot{x}_c + a_2 \dot{\theta}_c) - \dot{l}_{r2} - (1 + \sin \varphi_2) \dot{u}_2]^2 \quad (21),$$

wherein in the formulas, $c_{c1}$ and $c_{h1}$ are respectively damping coefficients of the left string rope and the left vertical section steel wire rope, and $c_{c2}$ and $c_{h2}$ are respectively damping coefficients of the right string rope and the right vertical section steel wire rope.

A Rayleigh's dissipation energy formula of the hoisting container system is shown as follows:

$$D_c = \tfrac{1}{2} c_{s1}(\dot{y}_c - b_1 \dot{\theta}_c)^2 + \tfrac{1}{2} c_{s2}(\dot{y}_c + b_2 \dot{\theta}_c)^2 + \tfrac{1}{2} c_{s3}(\dot{y}_c - b_1 \dot{\theta}_c)^2 + \tfrac{1}{2} c_{s4}(\dot{y}_c + b_2 \dot{\theta}_c)^2 \quad (22).$$

Based on the above, the kinetic energy, the potential energy and the Rayleigh's dissipation energy of the hoisting subsystem are respectively shown as follows:

$$T = T_{l11} + T_{l12} + T_{l21} + T_{l22} + T_{h1} + T_{h2} + T_c \quad (23),$$

$$U = U_{l1} + U_{l2} + U_{h1} + U_{h2} + U_c \quad (24), \text{ and}$$

$$D = D_{l1} + D_{l2} + D_c \quad (25).$$

11) The above formulas are substituted into a general equation:

$$M\ddot{q} + C\dot{q} + Kq = F \quad (26),$$

wherein in the formula, $\ddot{q}, \dot{q}$ and $q$ are respectively a generalized acceleration, speed and displacement, and $M$, $C$, $K$ and $F$ are respectively a mass matrix, a damping matrix, a stiffness matrix and a non-potential force of the hoisting subsystem, so that following formulas are obtained:

$$M = \begin{bmatrix} m_c + \tfrac{1}{3}\rho l_{h1} + \tfrac{1}{3}\rho l_{h2} & 0 & -\tfrac{1}{3}\rho l_{k1} a_1 + \tfrac{1}{3}\rho l_{h2} a_2 \\ 0 & m_c & 0 \\ -\tfrac{1}{3}\rho l_{h1} a_1 + \tfrac{1}{3}\rho l_{h2} a_2 & 0 & l_c - \tfrac{1}{3}\rho l_{h1} a_1^2 + \tfrac{1}{3}\rho l_{h2} a_2^2 \end{bmatrix}, \quad (1\text{-}2)$$

$$C = \begin{bmatrix} c_{h1} + \tfrac{1}{3}\rho l_{h1} + c_{h2}\tfrac{1}{3}\rho l_{h2} & 0 & -\left(c_{h1} + \tfrac{1}{3}\rho l_{h1}\right)a_1 + \left(c_{h2} + \tfrac{1}{3}\rho l_{h2}\right)a_2 \\ 0 & c_{s1} + c_{s2} + c_{s3} + c_{s4} & -c_{s1}b_1 + c_{s2}b_2 - c_{s3}b_1 + c_{s4}b_1 \\ -\left(c_{h1} + \tfrac{1}{3}\rho l_{h1}\right)a_1 + \left(c_{h2}\tfrac{1}{3}\rho l_{h2}\right)a_2 & -c_{s1}b_1 + c_{s2}b_2 - c_{s3}b_1 + c_{s4}b_1 & \left(c_{h1} + \tfrac{1}{3}\rho l_{h1}\right)a_1^2 + \left(c_{h2} + \tfrac{1}{3}\rho l_{h2}\right)a_2^2 + b_1^2 c_{s1} + b_2^2 c_{s2} + b_1^2 c_{s3} + b_2^2 c_{s4} \end{bmatrix}, \quad (1\text{-}3)$$

$$\begin{bmatrix} k_{h1} + k_{h2} & 0 & -k_{h1}a_1 + k_{h2}a_2 \\ 0 & k_{s1} + k_{s2} + k_{s3} + k_{s4} & -k_{s1}b_1 + k_{s2}b_2 - k_{s3}b_1 + k_{s4}b_2 \\ -k_{h1}a_1 + k_{h2}a_2 & -k_{s1}b_1 + k_{s2}b_2 - k_{s3}b_1 + k_{s4}b_2 & k_{h1}a_1^2 + k_{h2}a_2^2 + b_1^2 k_{s1} + b_2^2 k_{s2} + b_1^2 k_{s3} + b_2^2 k_{s4} \end{bmatrix}, \quad (1\text{-}4)$$

and $$F = \begin{bmatrix} -\tfrac{1}{6}\rho l_{h1}[\ddot{l}_{r1} + (\ddot{u}_1(1 + \sin\phi_1)] - \tfrac{1}{6}\rho l_{h2}[\ddot{l}_{r2} + (\ddot{u}_2(1 + \sin\varphi_2)] + \\ \left(-\tfrac{1}{6}\rho l_{h1} + c_{h1}\right)[\dot{l}_{r1} + \dot{u}_1(1 + \sin\varphi_1)] + \left(-\tfrac{1}{6}\rho l_{h2} + c_{h2}\right)[\dot{l}_{r2} + \dot{u}_2(1 + \sin\varphi_2)] + k_{h1} \\ [l_{r1} + u_1(1 + \sin\varphi_1)] + k_{h2}[l_{h2} + n_2(1 + \sin\varphi_2)] - m_c g - \tfrac{1}{2}\rho l_{h1} - \tfrac{1}{2}\rho l_{h2} \\ 0 \\ \tfrac{1}{6}\rho l_{h1} a_1[\ddot{l}_{r1} + \ddot{u}_1(1 + \sin\varphi_1)] - \tfrac{1}{6}\rho l_{h2} a_2[\ddot{l}_{r2} + \ddot{u}_2(1 + \sin\varphi_2)] + \\ \left(-\tfrac{1}{6}\rho l_{h1} + c_{h1}\right)a_1[\dot{l}_{r1} + \dot{u}_1(1 + \sin\varphi_1)] - \left(-\tfrac{1}{6}\rho l_{h2} + c_{h2}\right)a_2[\dot{l}_{r2} + \dot{u}_2(1 + \sin\varphi_2)] + k_{h1}a_1 \\ [l_{r1} + u_1(1 + \sin\varphi_2)] - k_{h2}a_2[l_{r2} + u_2(1 + \sin\varphi)]_2 + \tfrac{1}{2}\rho g l_{h1}a_1 - \tfrac{1}{2}\rho g l_{h2} a_2 \end{bmatrix}. \quad (1\text{-}5)$$

12) A system equation is simplified. In the modeling process of the hoisting subsystem, if it is assumed that no offset load condition exists, i.e., $a_1=a_2$, and further, when the anticlockwise rotation angle of the hoisting container is 0, the tension of the two steel wire ropes is consistent; and therefore, formula (30) may be simplified as $$(M_{31}\ddot{x}_c+M_{33}\ddot{\theta})+(C_{31}\dot{x}_c+C_{33}\dot{\theta})+(K_{31}x_c+K_{33}\theta)=F_{31} \quad (31),\text{ wherein}$$

in the formula, $M_{ij}$, $K_{ij}$ and $F_{ij}$ are respectively elements of the mass matrix, the damping matrix, the stiffness matrix and the non-potential force, i=1,2,3, and j=1,2,3.

Pose leveling of the hoisting container is regulated by two hydraulic executors, so that $u_1=u=-u_2$, an inclination angle $\theta$ of the hoisting container is a controlled variable, and formula (31) may be further simplified as:

$$A\ddot{\theta}+B\dot{\theta}+C\theta=Qii+Wii+Ru+F_0 \quad (32),\text{ wherein}$$

in the formula, $$\begin{cases} A = M_{33} \\ B = C_{33} \\ C = K_{33} \\ Q = \frac{1}{6}\rho l_{h1}a_1(1+\sin(\varphi_1)) + \frac{1}{6}\rho l_{h2}a_2(1+\sin(\varphi_2)) \\ W = \left(-\frac{1}{6}\rho l_{h1}+c_{h1}\right)a_1(1+\sin(\varphi_1)) + \left(-\frac{1}{6}\rho l_{h2}+c_{h2}\right)a_1(1+\sin(\varphi_2)) \\ R = k_{h1}a_1(1+\sin(\varphi_1)) + k_{h2}a_2(1+\sin(\varphi_2)) \\ F_0 = \frac{1}{6}\rho l_{h1}a_1\ddot{l}_{r1} - \frac{1}{6}\rho l_{h2}a_2\ddot{l}_{r2} + \left(-\frac{1}{6}\rho l_{h1}+c_{h1}\right)a_1\dot{l}_{r1} - \\ \left(-\frac{1}{6}\rho l_{h2}+c_{h2}\right)a_2\dot{l}_{r2} + k_{h1}a_1l_{r1} - k_{h2}a_2l_{r2} - M_{31}\ddot{x}_c - \\ C_{31}\dot{x}_c - K_{31}x_c + \frac{1}{2}\rho g l_{h1}a_1 - \frac{1}{2}\rho g l_{h2}a_2 \end{cases}$$

$k_{h1}$ and $k_{h2}$ are much greater than $c_{h1}$ and $c_{h2}$, so that formula (32) may be further simplified as:

$$A\ddot{\theta}+B\dot{\theta}+C\theta=Ru+F_0 \quad (33).$$

For the hoisting subsystem, a state variable is selected to be $x_1=[x_1,x_2]^T=[\theta,\dot{\theta}]^T$ so that a dynamic model of the hoisting subsystem may be converted into a state space form:

$$\begin{cases} \dot{x}_1 = x_2 \\ \dot{x}_2 = -h_1x_2 - h_2x_1 + h_3x_3 + f \end{cases}, \text{ and} \quad (34)$$

$y_1=x_1$, wherein
in the formulas, $h_1=B/A$, $h_2=C/A$, $h_3=R/A$, and $f=F_0/A$.

A building assumption of the above model is that: for the hoisting subsystem, both $\theta$ and $\dot{\theta}$ are bounded.

Further, the mathematical model of the electrohydraulic servo subsystem in step 2 is as follows.

The electrohydraulic servo subsystem includes a proportional servo valve in a floating hoisting sheave system and a double-outlet-rod hydraulic cylinder. It is assumed that for the electrohydraulic servo subsystem, a displacement reference signal $x_p$, a speed $\dot{x}_p$, an acceleration $\ddot{x}_p$, and a jerk $\dddot{x}_p$ of the hydraulic cylinder are all bounded.

A flow rate continuity equation of the double-outlet-rod hydraulic cylinder is as follows:

$$A_p\dot{x}_p + C_{tl}P_L + \frac{V_t}{4\beta_e}\dot{P}_L = Q_L, \quad (34)$$

wherein
in the formula, $A_p$ is an effective acting area of a hydraulic cylinder piston, $C_{tl}$ is a total leakage coefficient of the hydraulic cylinder, $x_p$ is displacement of a hydraulic cylinder piston rod, $V_t$ is a total volume of an oil inlet cavity and an oil return cavity of the hydraulic cylinder, $\beta_e$ is an effective volume elasticity modulus of oil liquid in the hydraulic cylinder, $P_L=p_1-p_2$, and is load pressure drop of the hydraulic cylinder, $p_1$ is pressure flowing into the hydraulic cylinder, $p_2$ is pressure flowing out of the hydraulic cylinder, $Q_L=Q_1-Q_2$, and is a load flow rate, $Q_1$ is a flow rate flowing into the hydraulic cylinder, and $Q_2$ is a flow rate flowing out of the hydraulic cylinder.

According to the Newton's second law, a load force balance equation of an electrohydraulic servo system is as follows:

$$-m\ddot{x}_p-B_p\dot{x}_p+A_pP_L=F_L \quad (35),$$

wherein $F_L$ is a force acting on the floating hoisting sheaves by a double-rod hydraulic cylinder, m is a total mass of the floating hoisting sheaves, and $B_p$ is a viscous damping coefficient of the hydraulic cylinder.

For the electrohydraulic servo subsystem, a state variable is selected to be $x_2=[x_3,x_4,x_5]^T=[x_p,\dot{x}_p,P_{hL}]_T$, $x_2=[x_3,x_4,x_5]^T=[x_p,\dot{x}_p,P_{hL}]^T$ so that a kinetic model of the electrohydraulic servo subsystem may be converted into a state space form:

$$\begin{cases} \dot{x}_3 = x_4 \\ \dot{x}_4 = a_1x_5 - a_2x_4 - a_3F_g \\ \dot{x}_5 = -a_4x_4 - a_5x_5 + a_6Q_L \end{cases}, \quad (36)$$

$y_2=x_3$, wherein
in the formulas, $a_1=A_p/m$, $a_2=B_p/m$, $a_3=1/m$, $a_4=4\beta_eA_p/V_t$, $a_5=4\beta_eC_{tl}/V_t$, and $a_6=4\beta_e/V_t$, so that control input u in formula (33) may be obtained.

Further, a concrete design of outputting the flatness characteristics of the nonlinear system in step 3 is as follows.

The following nonlinear system is considered:

$$\dot{x}=f(x,u) \quad (37),\text{ wherein}$$

in the formula, x is the system state variable, and u is the system control input with the same dimension as system output y.

If the following system output y exists $$y=P(x,\dot{u},\ddot{u},\ldots u^{(p)}) \quad (38),$$

the system state variable x and the system control input u may be expressed as equation forms of the system output and finite differential thereof:

$$x=P(y,\dot{y},\ddot{y},\ldots,y^{(q)}) \quad (39),\text{ and}$$

$$u=Q(y,\dot{y},\ddot{y},\ldots,y^{(q+1)}) \quad (40).$$

Formula (37) is called as flatness. The output of this system is flatness output.

Further, a concrete design of the post leveling flatness controller of the double-rope winding type ultra-deep vertical shaft hoisting subsystem in step 4 is as follows.

According to a design method of the flatness controller, in the hoisting subsystem (34), the system output is $y_1=x_1$, and the system control input is $u_h=x_3$.

For the hoisting subsystem, a flatness equation from $y_1$, $\dot{y}_1$ and $\ddot{y}_1$ to the system state variable $x_1$ and the system control input $u_h$ is as follows:

$$\begin{bmatrix} x_1 \\ x_2 \\ u_h \end{bmatrix} = \begin{bmatrix} y_1 \\ \dot{y}_1 \\ (h_1\dot{y}_1 + h_2 y_1 - f + \ddot{y}_1)/h_3 \end{bmatrix}. \quad (41)$$

An expected state variable of the hoisting subsystem is defined according to $x_{1d}=[x_{1d},x_{2d}]^T=[y_{1d},\dot{y}_{1d}]^T$ in the formula, $y_{1d}$ represents the system expected output, i.e., a reference signal, and a dynamical equation of a system expected state variable $x_{1d}$ is as follows:

$$\begin{bmatrix} x_1 \\ x_2 \\ u_h \end{bmatrix} = \begin{bmatrix} y_1 \\ \dot{y}_1 \\ (h_1\dot{y}_1 + h_2 y_1 - f + \ddot{y}_1)h_3 \end{bmatrix}. \quad (41).$$

System open-loop input $u_{hd}$ is as follows:

$$u_{hd}=(h_1\dot{y}_{1d}+h_2 y_{1d}-f+\ddot{y}_{1d})/h_3 \quad (42).$$

The system state tracking error is defined as $z_1=[z_1,x_2]^T=[x_{1d}-x_1, x_{2d}-x_2]^T$, and a dynamical equation of the system tracking error is as follows:

$$\begin{bmatrix} \dot{z}_1 \\ \dot{z}_2 \end{bmatrix} = \begin{bmatrix} z_2 \\ -h_1 z_2 - h_2 z_1 - h_3(u_{hd}-u_h) \end{bmatrix}. \quad (43).$$

If $u_{hd}=u_h$, we may acquire $$\begin{bmatrix} \dot{z}_1 \\ \dot{z}_2 \end{bmatrix} = \begin{bmatrix} z_2 \\ -h_1 z_2 - h_2 z_1 \end{bmatrix}. \quad (44).$$

By writing the formula as a matrix form, it is:

$$\dot{z}_1 = A_h z_1 \quad (45),\text{ wherein}$$

in the formula, $$A_h = \begin{bmatrix} 0 & 1 \\ -h_2 & -h_1 \end{bmatrix}.$$

$A_h$ is a Hurwitz matrix, and an error $z_1$ exponentially approaches to 0. An approaching speed may not be only in accordance with the open-loop control input, so that control input with state feedback is defined as $$u_h = u_{hd} + \frac{1}{h_3}K_1 z_1, \quad (46)$$

in the formula, $K_1[k_1,k_2]$, so that a system tracking error dynamical equation with the state feedback is as follows:

$$\dot{z}_1 = A_{hk} z_1 \quad (47),\text{ wherein}$$

in the formula, $$A_{hk} = \begin{bmatrix} 0 & 1 \\ -\theta_2 - k_1 & -\theta_1 - k_2 \end{bmatrix}.$$

By properly selecting a system control gain matrix $K_1$, a matrix $A_{hk}$ is enabled to be the Hurwitz matrix. At the moment, the system tracking error $z_1$ may exponentially approach to 0.

A hoisting subsystem control rule may be summarized as follows:

$$\begin{cases} x_{1d} = y_{1d} \\ x_{2d} = \dot{y}_{1d} \\ u_{hd} = (h_1\dot{y}_{1d} + h_2 y_{1d} - f + \ddot{x}_{2d})/h_3 \\ z_1 = x_{1d} - x_1 \\ z_2 = x_{2d} - x_2 \\ u_h = u_{hd} + \dfrac{1}{h_3} K_1 z_1 \end{cases} \quad (48)$$

Further, a design of the position closed-loop flatness controller of the electrohydraulic servo subsystem in step 5 is as follows.

According to the electrohydraulic servo subsystem (36), the system output is $y_2=y_3$, and the system control input is $u_L=Q_L$, so that the following flatness equation of the control input $u_L$ may be obtained:

$$\begin{bmatrix} x_3 \\ x_4 \\ x_5 \\ x_L \end{bmatrix} = \begin{bmatrix} y_2 \\ \dot{y}_2 \\ \dfrac{1}{a_1}(\ddot{y}_2 + a_2 \dot{y}_2 + a_3 F_g) \\ \dfrac{1}{a_6}(a_4 \dot{y}_2 + a_5 x_5 + \dot{x}_5) \end{bmatrix}. \quad (49)$$

The system expected state variable is defined. In the formula, $y_{2d}$ is the system expected output, i.e., the reference signal. That is, a dynamical of the system expected variable $x_{2d}=[x_{3d},x_{4d},x_{5d}]^T$ is:

$$\frac{d}{dt}\begin{bmatrix} x_{3d} \\ x_{4d} \\ x_{5d} \end{bmatrix} = \begin{bmatrix} x_{4d} \\ a_1 x_{5d} - a_2 x_{4d} - a_3 F_g \\ -a_4 x_{4d} - a_5 x_{5d} + a_6 u_L \end{bmatrix}. \quad (50)$$

Thus the system open-loop input $u_{Ld}$ may be obtained as follows:

$$u_{Ld} = \frac{1}{a_6}(a_4 \dot{y}_{2d} + a_5 x_{5d} + \dot{x}_{5d}). \quad (51)$$

The system tracking error $z_2=[z_3,z_4,z_5]^T=[x_{3d}-x_3, x_{4d}-x_4, x_{5d}-x_5]^T$ is defined. Therefore, a dynamical of the system tracking error is:

$$\begin{bmatrix} \dot{z}_3 \\ \dot{z}_4 \\ \dot{z}_5 \end{bmatrix} = \begin{bmatrix} z_4 \\ a_1 z_5 - a_2 z_4 \\ -a_4 z_4 - a_5 z_5 + a_6(u_{Ld}-u_L) \end{bmatrix}. \quad (52)$$

When $u_{Ld}=u_L$, we may acquire $$\begin{bmatrix} \dot{z}_3 \\ \dot{z}_4 \\ \dot{z}_5 \end{bmatrix} = \begin{bmatrix} z_4 \\ a_1 z_5 - a_2 z_4 \\ -a_4 z_4 - a_5 z_5 \end{bmatrix}. \quad (53)$$

By writing the formula into a matrix form, it is:

$$\dot{z}_2 = A_L z_2 \quad (54), \text{ wherein}$$

in the formula, $$A_L = \begin{bmatrix} 0 & 1 & 0 \\ 0 & -a_2 & a_1 \\ 0 & -a_4 & -a_5 \end{bmatrix}.$$

Further, the control input with the state feedback is defined as $$u_L = u_{Ld} + \frac{1}{a_6} K_2 z_2, \quad (55)$$

in the formula, $K_2[k_3,k_4,k_5]^T$. A tracking error dynamical equation with the state feedback is as follows:

$$\dot{z}_2 = A_{Lk} z_2 \quad (56), \text{ wherein}$$

in the formula, $$A_{Lk} = \begin{bmatrix} 0 & 1 & 0 \\ 0 & -a_2 & a_1 \\ -k_3 & -a_4 - k_4 & -a_5 - k_5 \end{bmatrix}.$$

The proper control gain matrix $K_2$ is selected so that the matrix $A_{LK}$ is the Hurwitz matrix, and the system tracking error $z_2$ exponentially approaches to 0. Therefore, the following control formula of the electrohydraulic servo subsystem is obtained:

$$\begin{cases} x_{3d} = \dot{y}_{2d} \\ x_{4d} = \ddot{y}_{2d} \\ x_{5d} = \dfrac{1}{a_6}(\dddot{y}_{2d} + a_4 \ddot{y}_{2d} + a_5 \dot{y}_{2d} - a_3 F_g) \\ u_{Ld} = \dfrac{1}{a_6}(a_4 x_{4d} + a_5 x_{5d} + \dot{x}_{5d}) \\ z_3 = x_{3d} - x_3 \\ z_4 = x_{4d} - x_4 \\ z_5 = x_{5d} - x_5 \\ u_L = u_{Ld} + \dfrac{1}{a_6} K_2 z_2 \end{cases} \quad (57)$$

Compared with an existing popular design method of the backstepping controller, the present invention has the advantages that the derivation process of the system state variables is omitted, so that the design process of the controller is greatly simplified; the response time of the controller may be shortened, and the hoisting container may fast reach a leveling state; in an application process of the system, sensor measurement noise and system non-modeling characteristics may be amplified through state variable derivation, so that the tracking errors may be reduced through the design of the flatness controller; the control process is more precise; and good control performance is ensured.

DETAILED DESCRIPTION OF THE INVENTION

The present invention will be described in detail with reference to the accompanying drawings and a concrete embodiment.

Figure 1:
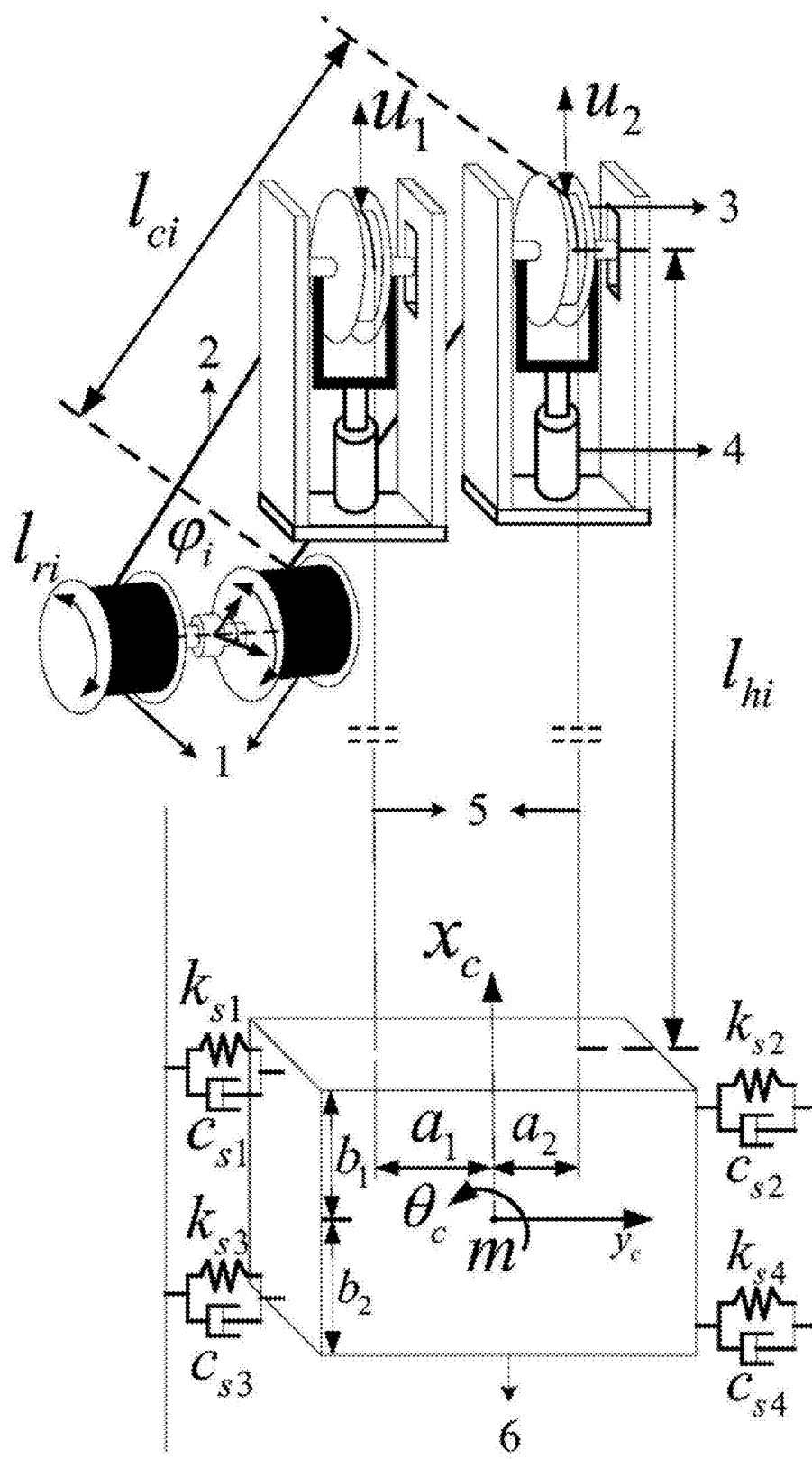
FIG. 1 is a schematic structural diagram of a hoisting system of the present invention.
Figure 2:
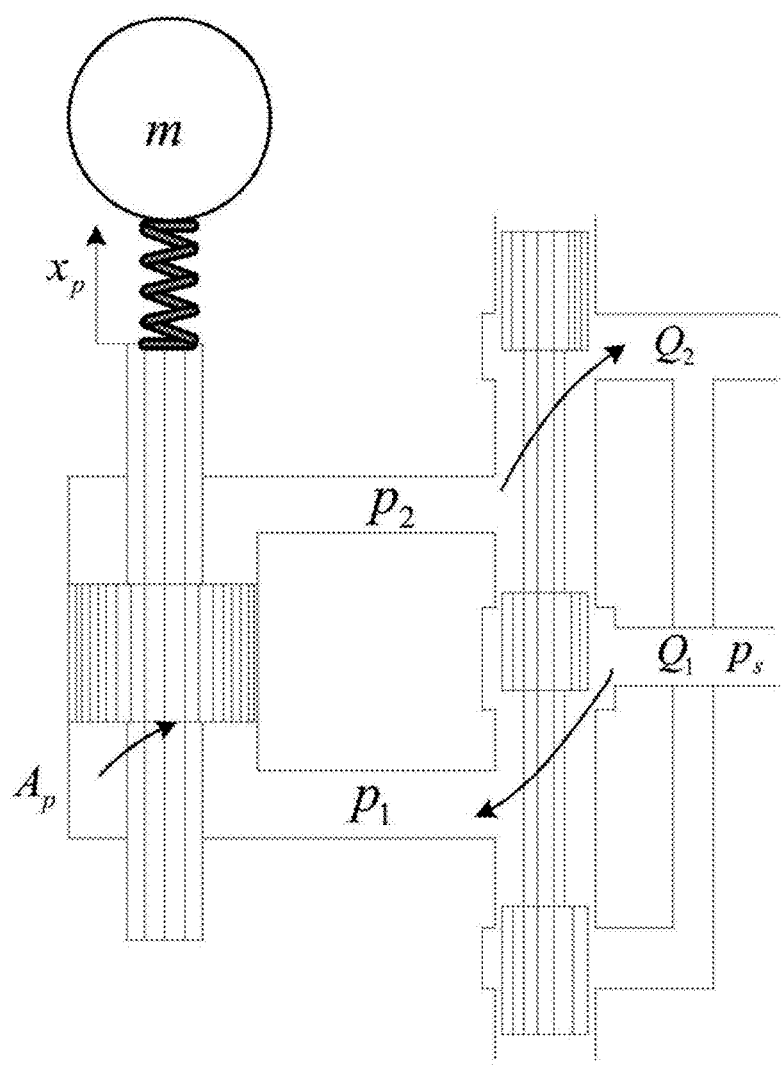
FIG. 2 is a kinetic model diagram of a double-outlet-rod hydraulic cylinder.

As shown in FIG. 1 and FIG. 2, for an oil source pressure $P_s$ of a hydraulic system, $P_s=15*10^6$ Pa. For an effective acting area $A_p$ of a double-outlet-rod hydraulic cylinder 4, $A_p=1.88*10^{-3}$ m². For a load mass m of the hydraulic system, m=200 kg. For a viscous damping coefficient $B_p$ of the hydraulic system, $B_p=25000$ N(m/s). For a total volume $V_t$ of an oil inlet cavity and an oil return cavity of the hydraulic cylinder, $V_t=0.96*10^{-3}$ m³. For a total leakage coefficient $C_{t1}$ of the hydraulic system, $C_{t1}=9.2*10^{-13}$ m³/(s/Pa). For a volume elasticity modulus $\beta_e$ of hydraulic oil, $\beta_e=6.9*10^8$ Pa. For vertical distances $b_1$ and $b_2$ from upper and lower surfaces of a hoisting container 6 to a gravity center of the hoisting container, $b_1=b_2=0.0625$ m. For horizontal distances $a_1$ and $a_2$ from connecting points of two vertical section steel wire ropes 5 on the hoisting container 6 to the gravity center of the hoisting container, $a_1=a_2=0.1575$ m. For initial lengths $l_{h20}$ and $l_{h20}$ of the vertical section steel wire ropes 5, $l_{h20}=l_{h20}=6$ m. For a rotational inertia $I_c$ of the hoisting container 6, $I_c=3.307$ kg·m⁻². For a unit length mass ρ of the steel wire rope, ρ=0.417 kg/m. For inclination angles $a_1$ and $a_2$ of left and right string ropes 2, $a_1=a_2=64.5°$. For radii $r_1$ and $r_2$ of two floating hoisting sheaves 3, $r_1=r_2=0.2$ m. For masses $m_1$ and $m_2$ of the two floating hoisting sheaves 3, $m_1=m_2=10$ kg. For a mass $m_c$ of the hoisting container 6, $m_c=120$ kg. For transverse equivalent damping coefficients $c_{s1}$, $c_{s2}$, $c_{s3}$ and $c_{s4}$ of four pairs of spring-damping models, $c_{s1}=c_{s2}=c_{s3}=c_{s4}=10$ N/(m/s). For transverse equivalent stiffness $k_{s1}$, $k_{s2}$, $k_{s3}$ and $k_{s4}$ of the four pairs of spring-damping models, $k_{s1}=k_{s2}=k_{s3}=k_{s4}=1000$ Pa.

For control parameters of a flatness controller, $K_1=[k_1,k_2]=[20,10]$, and $K_2=[k_3,k_4,k_5]=[3*10^{14}, 2*10^{12}, 2]$.

For control parameters of a backstepping controller, $k_1=20$, $k_2=20$, $k_3=300$, $k_4=280$, and $k_5=260$.

An initial angle of the hoisting container is set to be 5°.

Figure 3:
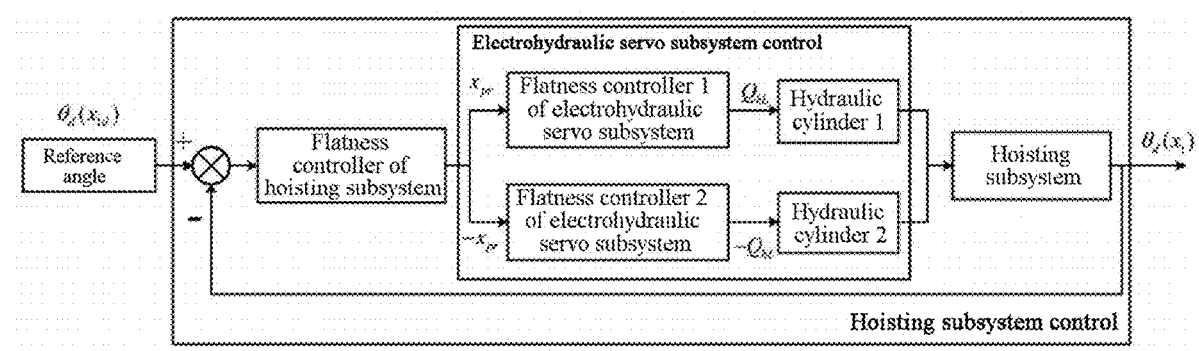
FIG. 3 is a structural block diagram of a control system of the present invention.
Figure 4:
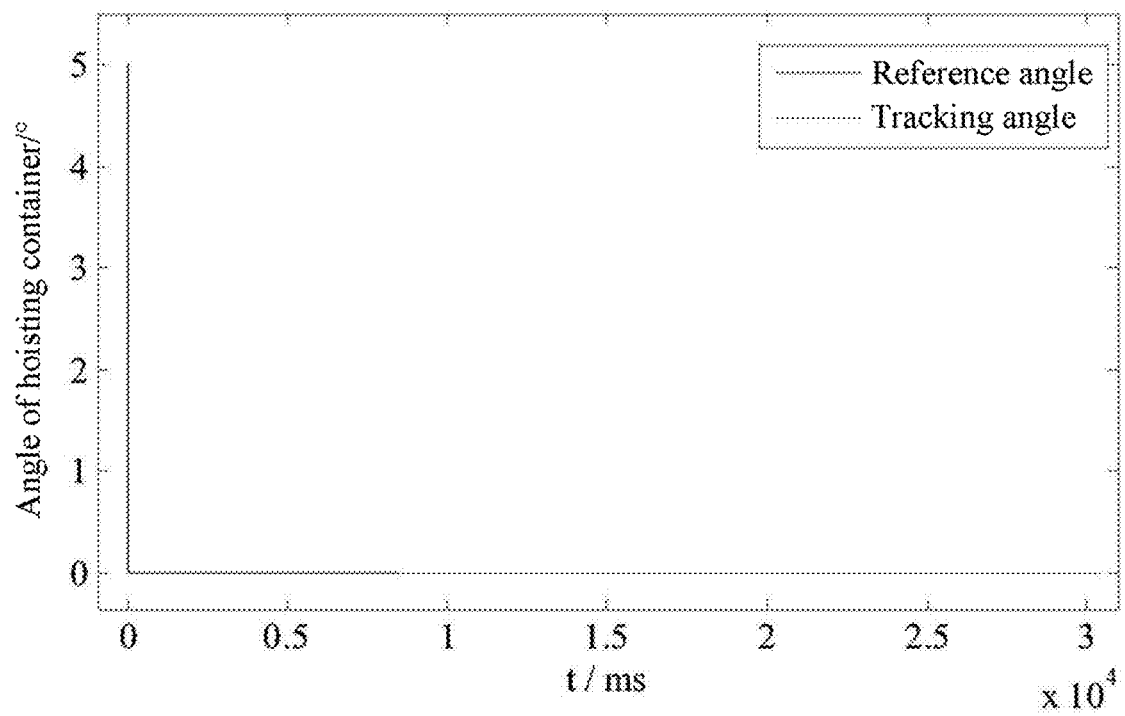
FIG. 4 is a comparison diagram of angle tracking signals of a hoisting container of a flatness controller in a concrete embodiment of the present invention.
Figure 5:
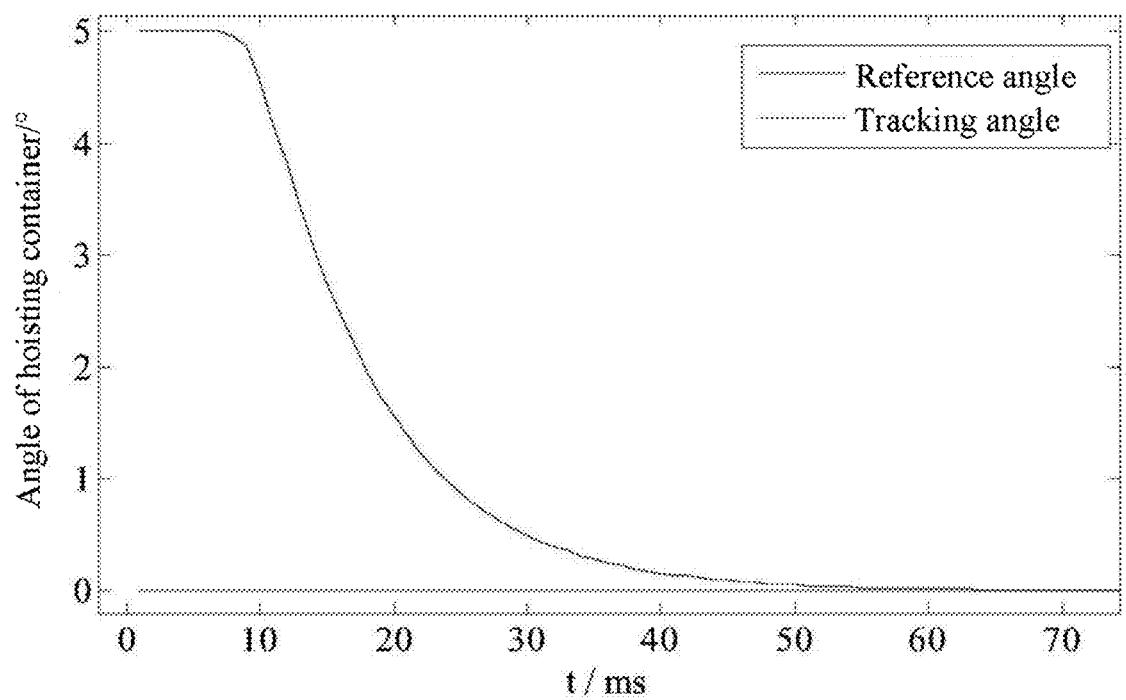
FIG. 5 is a partial enlarged diagram of the angle tracking signals of the hoisting container of the flatness controller in the concrete embodiment of the present invention.
Figure 6:
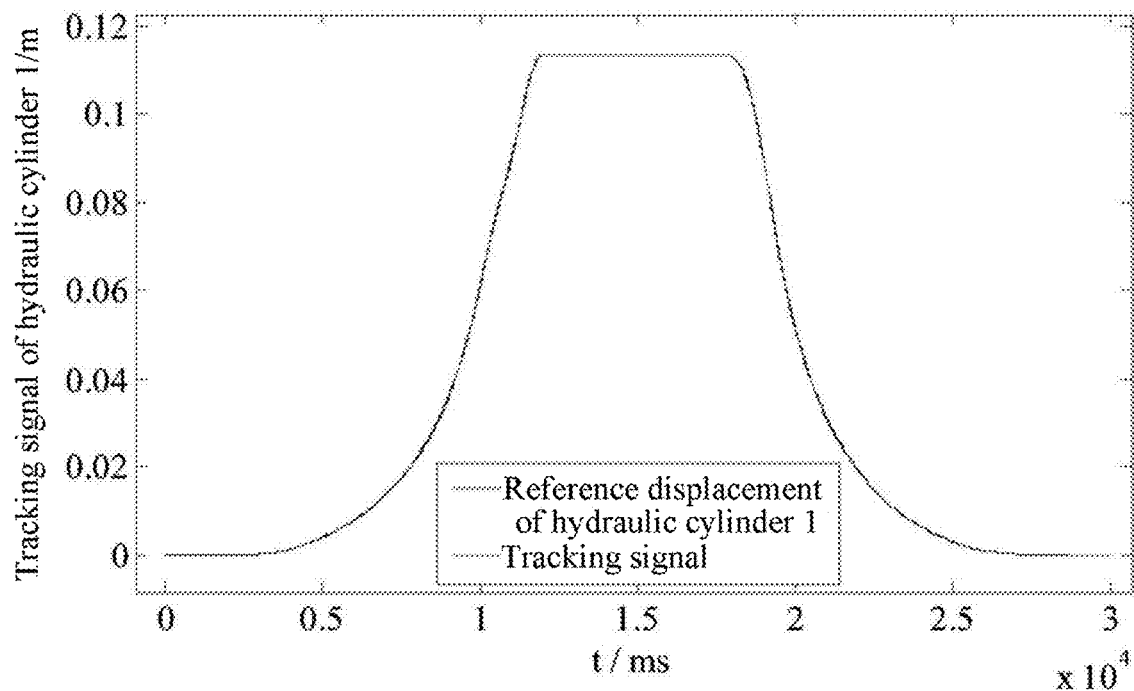
FIG. 6 is a comparison diagram of tracking signals of a hydraulic cylinder 1 of the flatness controller in the concrete embodiment of the present invention.
Figure 7:
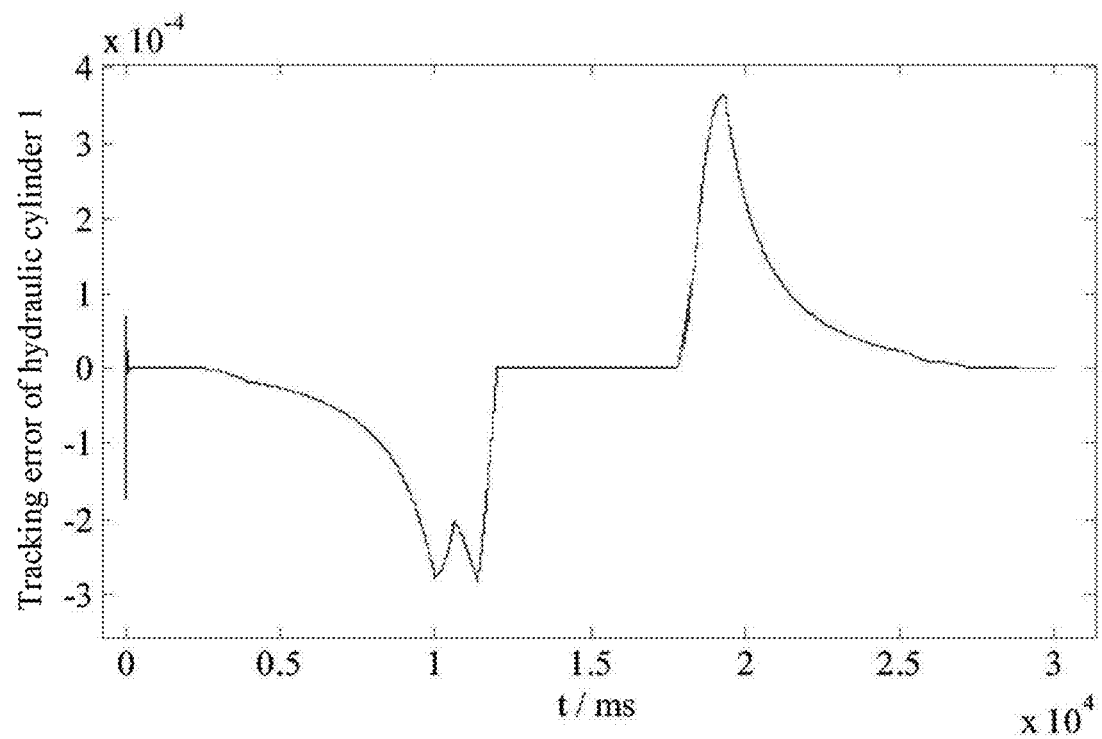
FIG. 7 is a tracking error diagram of the hydraulic cylinder 1 of the flatness controller in the concrete embodiment of the present invention.
Figure 8:
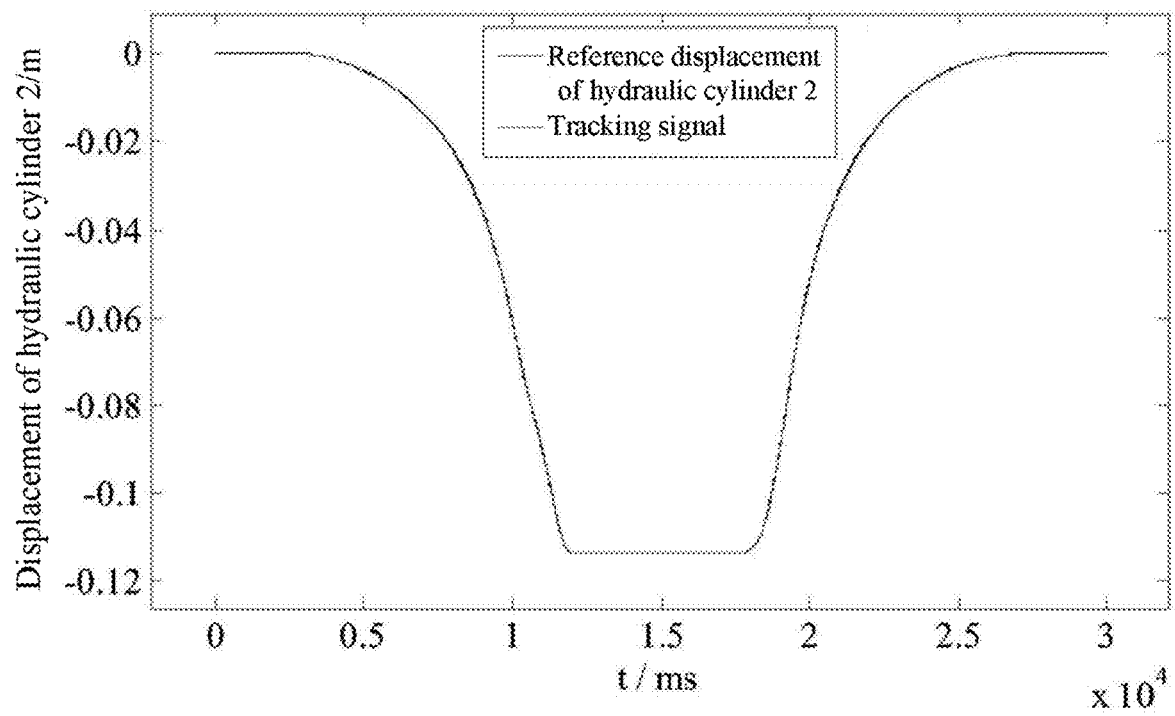
FIG. 8 is a comparison diagram of tracking signals of a hydraulic cylinder 2 of the flatness controller in the concrete embodiment of the present invention.
Figure 9:
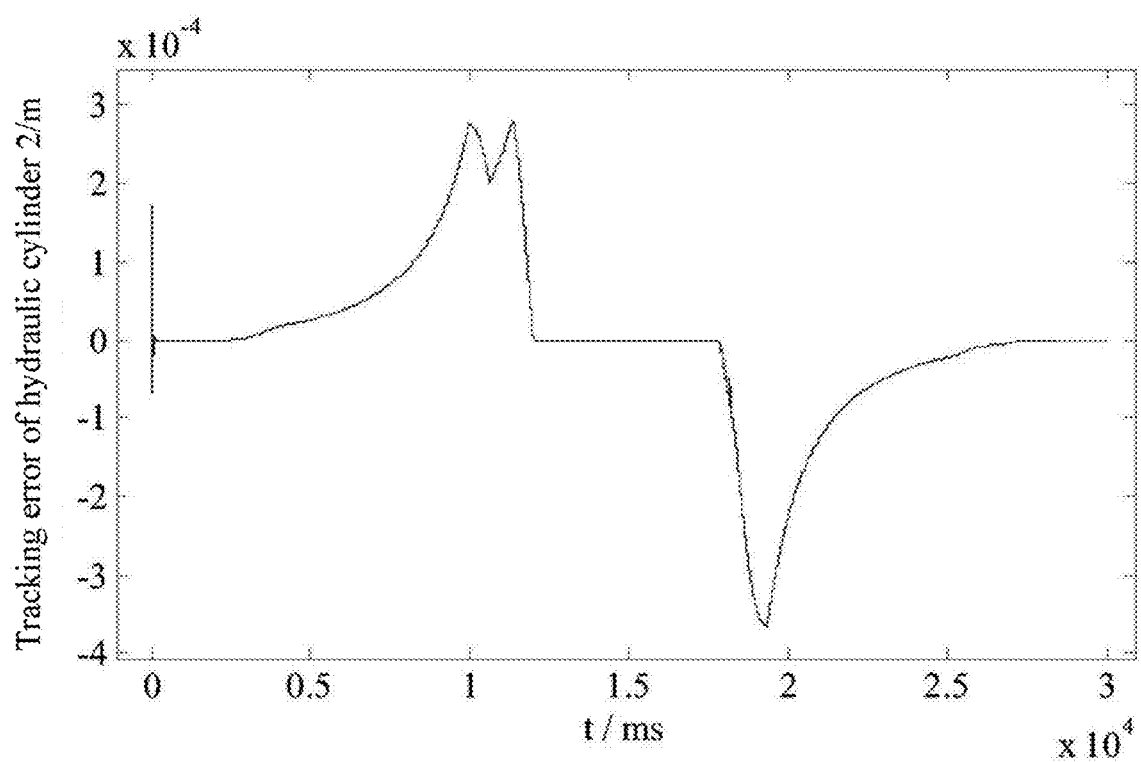
FIG. 9 is a tracking error diagram of the hydraulic cylinder 2 of the flatness controller in the concrete embodiment of the present invention.
Figure 10:
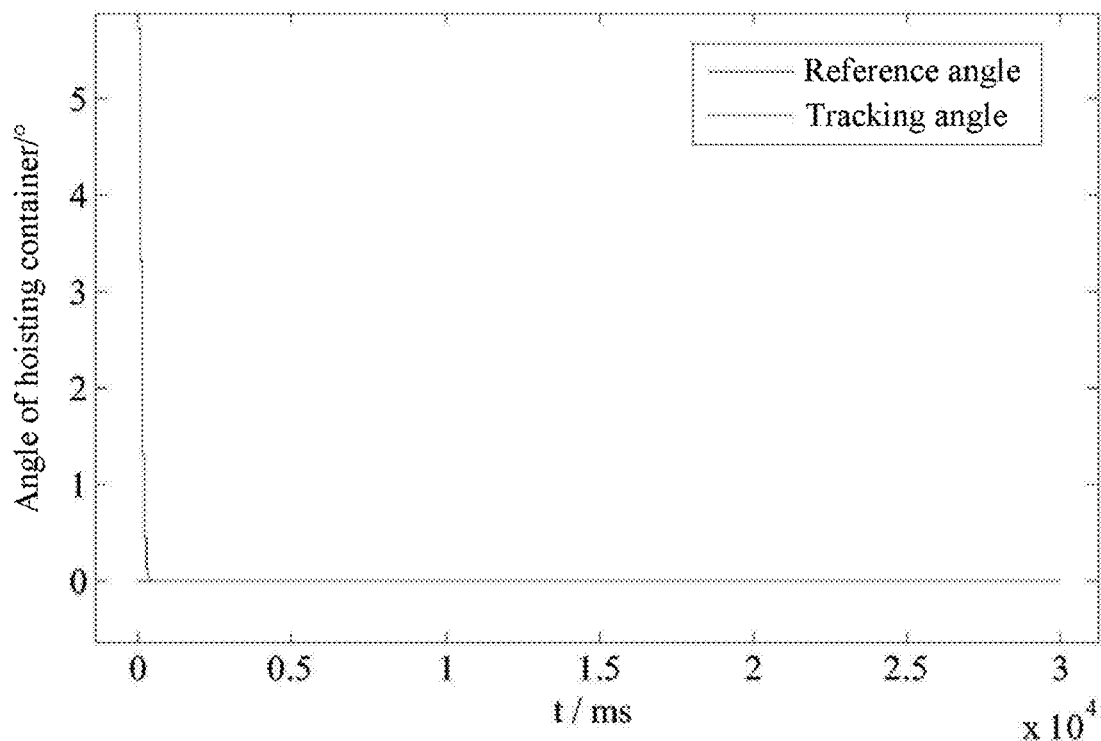
FIG. 10 is a comparison diagram of angle tracking signals of a hoisting container of a backstepping controller in the concrete embodiment of the present invention.
Figure 11:
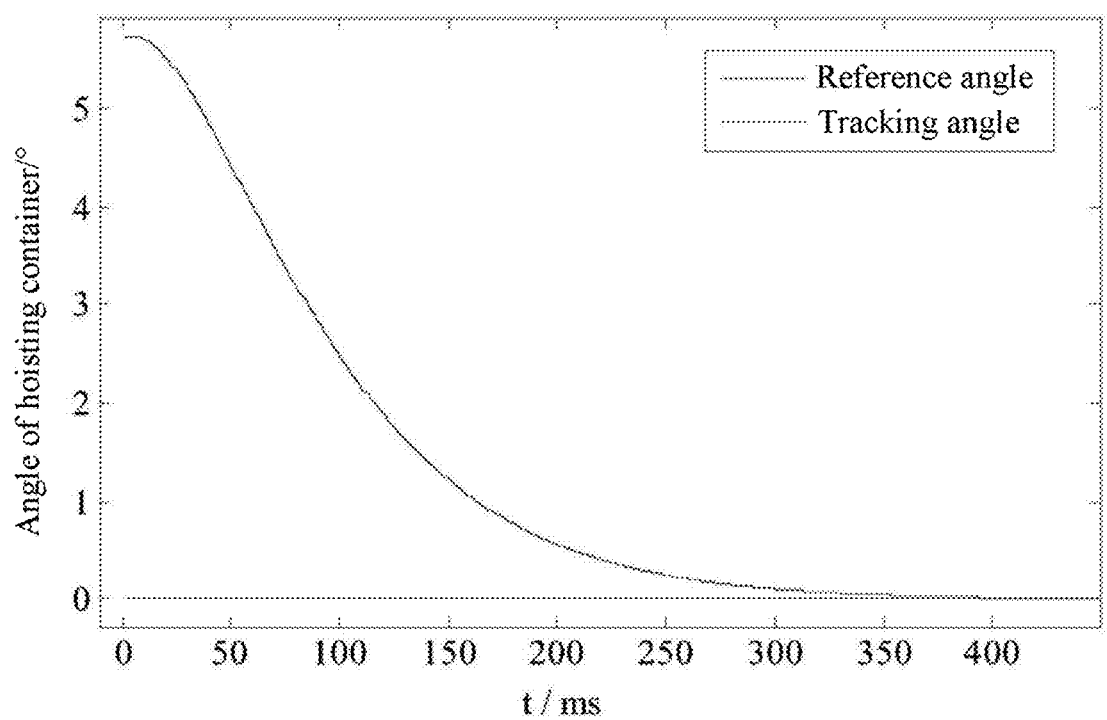
FIG. 11 is a partial enlarged diagram of the angle tracking signals of the hoisting container of the backstepping controller in the concrete embodiment.
Figure 12:
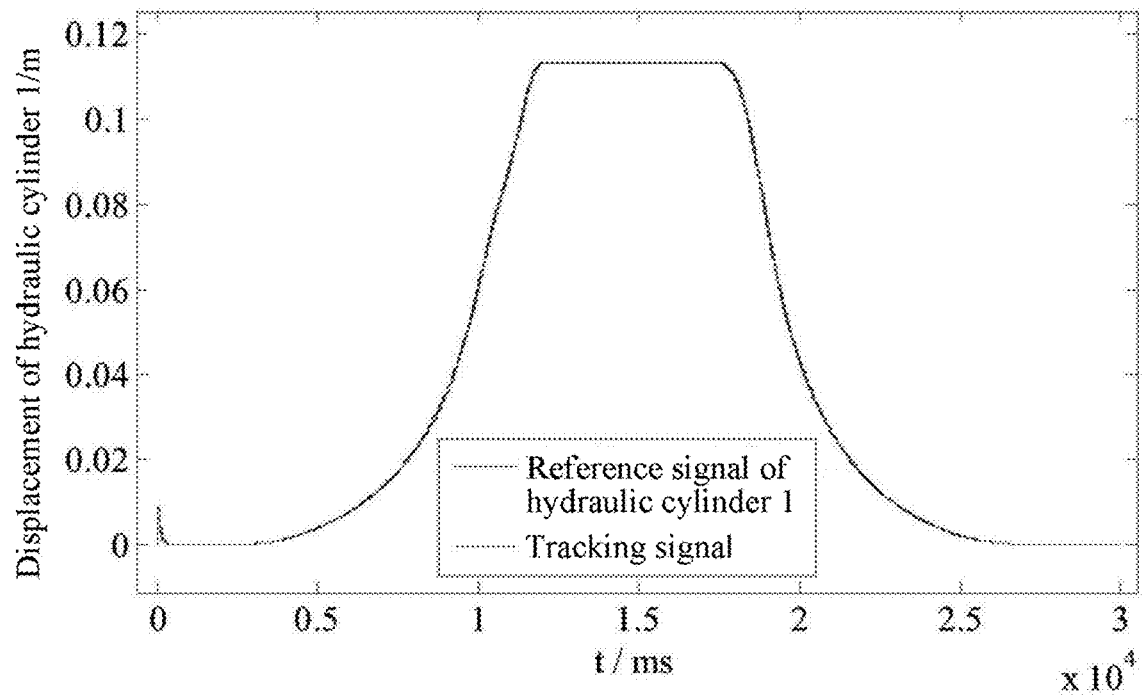
FIG. 12 is a comparison diagram of tracking signals of a hydraulic cylinder 1 of the backstepping controller in the concrete embodiment.
Figure 13:
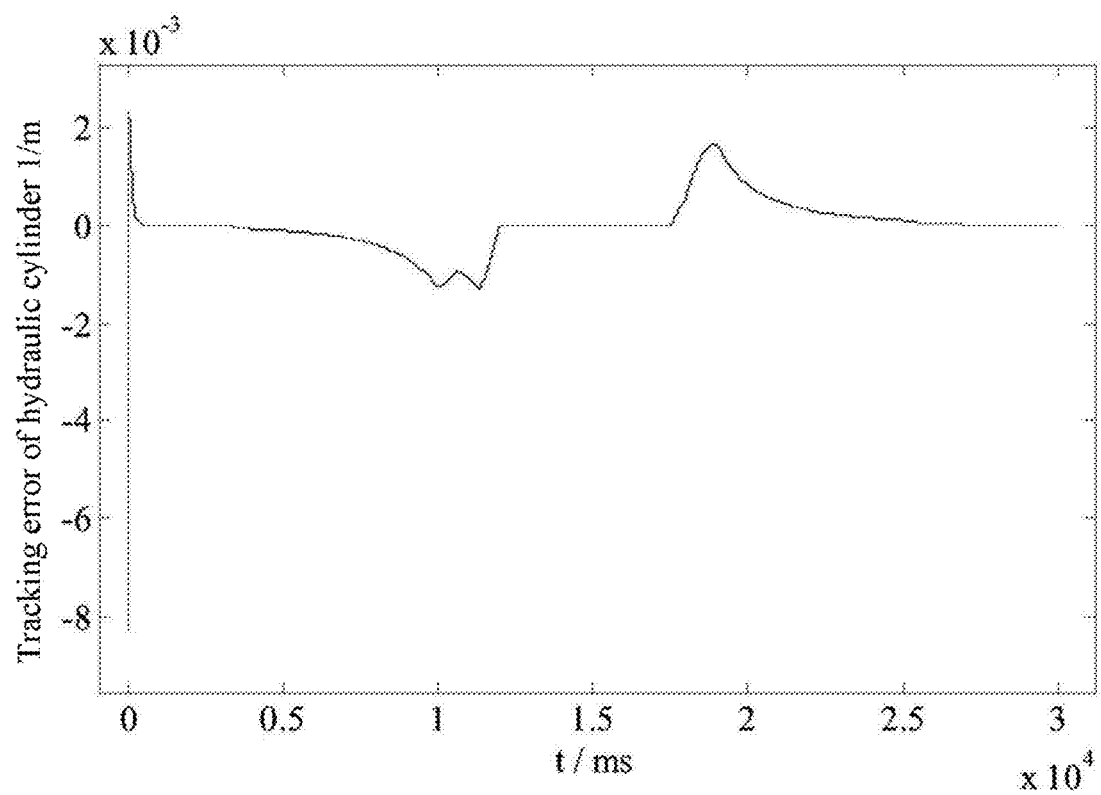
FIG. 13 is a tracking error diagram of the hydraulic cylinder 1 of a backstepping controller in the concrete embodiment.
Figure 14:
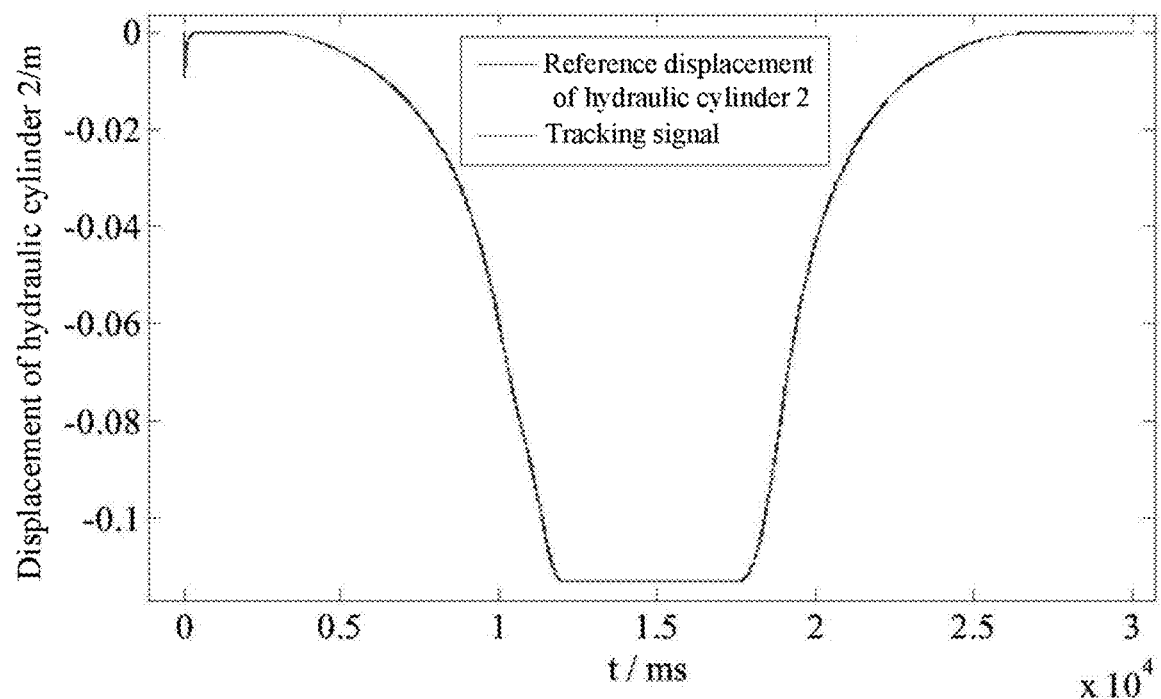
FIG. 14 is a comparison diagram of tracking signals of a hydraulic cylinder 2 of the backstepping controller in the concrete embodiment.
Figure 15:
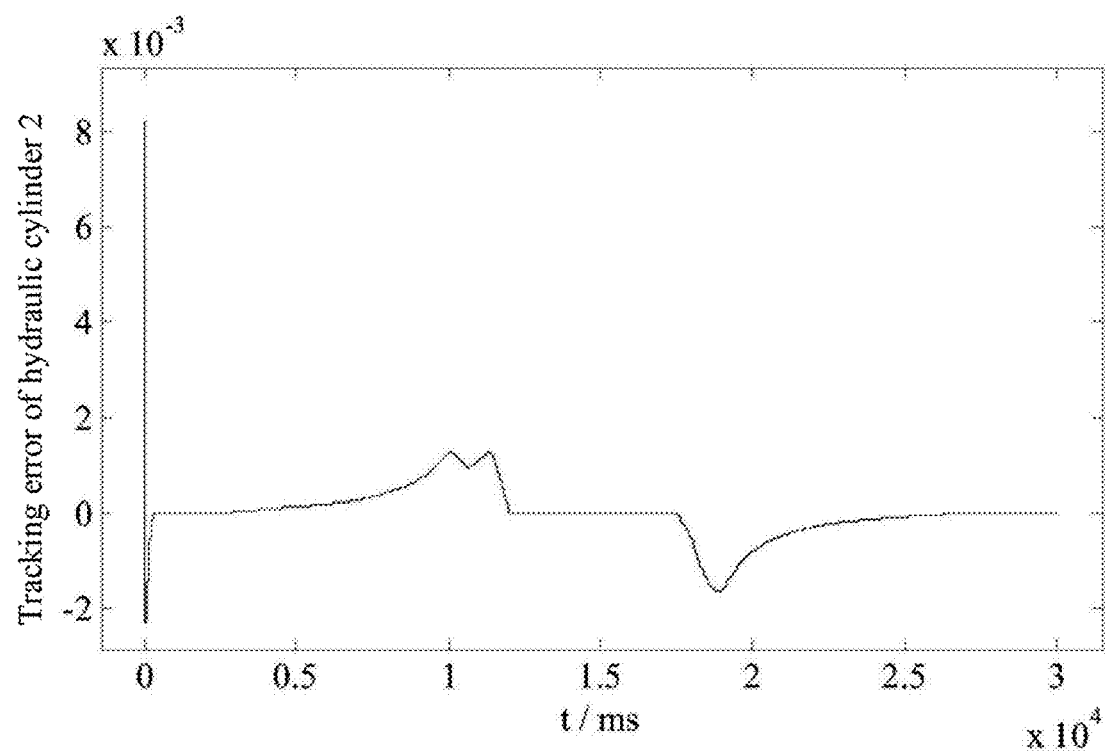
FIG. 15 is a tracking error diagram of the hydraulic cylinder 2 of the backstepping controller in the concrete embodiment.
Figure 16:
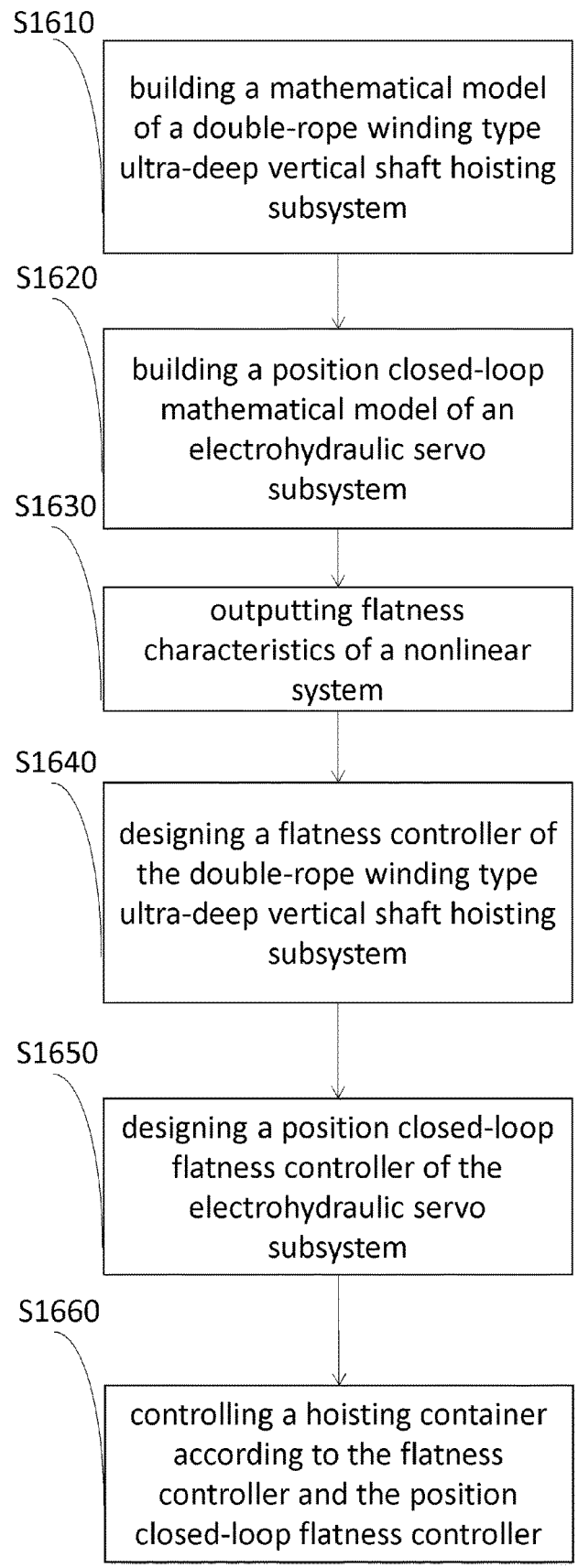

As shown in FIG. 3, the steps of leveling the hoisting container of the flatness controller are as follows:

1) A state space form of a kinetic model of a hoisting subsystem is:

$$\begin{cases} \dot{x}_1 = x_2 \\ \dot{x}_2 = -h_1 x_2 - h_2 x_1 + h_3 x_3 + f \end{cases} \quad (34)$$

$y_1 = x_1$, wherein in the formula, $h_1 = B/A$, $h_2 = C/A$, $h_3 = R/A$, and $f = F_0/A$.

2) A state space form of a kinetic model of an electrohydraulic servo subsystem is:

$$\begin{cases} \dot{x}_3 = x_4 \\ \dot{x}_4 = a_1 x_5 - a_2 x_4 - a_3 F_g \\ \dot{x}_5 = -a_4 x_4 - a_5 x_5 + a_6 Q_L \end{cases} \quad (36)$$

$y_2 = x_3$, wherein in the formula, $a_1 = A_p/m$, $a_2 = B_p/m$, $a_3 = 1/m$, $a_4 = 4\beta_e A_p/V_t$, $a_5 = 4\beta_e C_{tt}/V_t$ and $a_6 = 4\beta_e/V_t$.

3) A system state variable x and a system control input u may be expressed as the following equation form of the system flatness characteristic output and a finite differential thereof:

$$x = P(y, \dot{y}, \ddot{y}, \ldots y^{(q)}) \quad (39), \text{ and}$$

$$u = Q(y, \dot{y}, \ddot{y}, \ldots, y^{(q)}) \quad (40).$$

4) A concrete design of a pose leveling flatness controller of a double-rope winding type ultra-deep vertical shaft hoisting subsystem is as follows:

$$\begin{cases} x_{1d} = y_{1d} \\ x_{2d} = \dot{y}_{1d} \\ u_{hd} = (h_1 \dot{y}_{1d} + h_2 y_{1d} - f + \ddot{x}_{2d})/h_3 \\ z_1 = x_{1d} - x_1 \\ z_2 = x_{2d} - x_2 \\ u_h = u_{hd} + \dfrac{1}{h_3} K_1 z_1 \end{cases} \quad (47)$$

5) A design of a position closed-loop flatness controller of the electrohydraulic servo subsystem is as follows:

$$\begin{cases} x_{3d} = y_{2d} \\ x_{4d} = \dot{y}_{2d} \\ x_{5d} = \dfrac{1}{a_6}(\ddot{y}_{2d} + a_4 \dot{y}_{2d} + a_5 y_{2d} - a_3 F_g) \\ u_{Ld} = \dfrac{1}{a_6}(a_4 x_{4d} + a_5 x_{5d} + \dot{x}_{5d}) \\ z_3 = x_{3d} - x_3 \\ z_4 = x_{4d} - x_4 \\ z_5 = x_{5d} - x_5 \\ u_L = u_{Ld} + \dfrac{1}{a_6} K_2 z_2 \end{cases} \quad (57)$$

According to parameter input of the concrete embodiment, the obtained leveling performance of the hoisting container of the flatness controller is shown in FIG. 4 to FIG. 9.

A pose leveling control design of the hoisting container of the backstepping controller is as follows:

$$\begin{cases} z_1 = x_{1d} - x_{1r} \\ z_2 = x_{2d} - \alpha_1 \\ \alpha_1 = k_1 z_1 + \dot{x}_{1r} \\ u_h = \dfrac{1}{h_3}(h_1 x_2 + h_2 x_1 - f + \dot{\alpha}_1 - k_2 z_2 + z_1) \end{cases} \quad (48)$$

A position closed-loop control process of the electrohydraulic servo subsystem of the backstepping controller is as follows:

$$\begin{cases} z_3 = x_{3d} - x_3 \\ z_4 = \alpha_3 - x_4 \\ z_5 = \alpha_4 - x_5 \\ \alpha_3 = -k_3 z_3 + \dot{x}_{3d} \\ \alpha_4 = \dfrac{1}{a_1}\left(z_3 + a_2 x_2 - \dfrac{F_g}{a_3} + \dot{\alpha}_3 + k_4 z_4\right) \\ u_L = \dfrac{1}{a_6}(k_5 z_5 + \dot{\alpha}_4 + a_4 x_2 + a_5 x_3 + a_1 z_4) \end{cases} \quad (58)$$

According to parameter input in the concrete embodiment, leveling performance of the hoisting container of the backstepping controller is shown in FIG. 10 to FIG. 15.

From the angle tracking performance of the hoisting containers of the two controllers, the hoisting containers may both reach a leveling state in a certain time, but the flatness controller enables the hoisting container to reach the leveling state in 70 ms, and the backstepping controller enables the hoisting container to reach a stable state in 450 ms. From the position tracking performance of two hydraulic cylinders, the tracking error of the backstepping controller is greater than that of the flatness controller. Based on the above, the control performance of the flatness controller is superior to that of the backstepping controller.

What is claimed is:

1. A hoisting container pose control method of a double-rope winding type ultra-deep vertical shaft hoisting system, comprising:
    step 1, building a mathematical model of a double-rope winding type ultra-deep vertical shaft hoisting subsystem;
    step 2, building a position closed-loop mathematical model of an electrohydraulic servo subsystem;

step 3, outputting flatness characteristics of a nonlinear system;
step 4, designing a flatness controller of the double-rope winding type ultra-deep vertical shaft hoisting subsystem based on the mathematical model;
step 5, designing a position closed-loop flatness controller of the electrohydraulic servo subsystem based on the position closed-loop mathematical model; and
step 6, controlling a hoisting container based on the flatness controller, the position closed-loop flatness controller, and the flatness characteristics of the nonlinear system,
wherein the mathematical model of the double-rope winding type ultra-deep vertical shaft hoisting subsystem in step 1 is as follows:

$$M\ddot{q}+C\dot{q}+Kq=F \quad (1\text{-}1), \text{ wherein}$$

in the formula, $\ddot{q}, \dot{q}$ and $q$ are respectively a generalized acceleration, speed and displacement, $q=[x_c, y_c, \theta]$, $x_c$ and $y_c$ are respectively a vertical displacement and a horizontal displacement of a gravity center of the hoisting container, $\theta$ is an anticlockwise rotation angle of the hoisting container, and M, C, K and F are respectively a mass matrix, a damping matrix, a stiffness matrix and a non-potential force of the hoisting subsystem wherein $$M = \begin{bmatrix} m_c + \frac{1}{3}\rho l_{h1} + \frac{1}{3}\rho l_{h2} & 0 & -\frac{1}{3}\rho l_{h1}a_1 + \frac{1}{3}\rho l_{h2}a_2 \\ 0 & m_c & 0 \\ -\frac{1}{3}\rho l_{h1}a_1 + \frac{1}{3}\rho l_{h2}a_2 & 0 & I_c - \frac{1}{3}\rho l_{h1}a_1^2 + \frac{1}{3}\rho l_{h2}a_2^2 \end{bmatrix},$$

$$C = \begin{bmatrix} c_{h1} + \frac{1}{3}\rho l_{h1} + c_{h2} + \frac{1}{3}\rho l_{h2} & 0 & -\left(c_{h1} + \frac{1}{3}\rho l_{h1}\right)a_1 + \left(c_{h2} + \frac{1}{3}\rho l_{h2}\right)a_2 \\ 0 & c_{s1} + c_{s2} + c_{s3} + c_{s4} & -c_{s1}b_1 + c_{s2}b_2 - c_{s3}b_1 + c_{s4}b_2 \\ -\left(c_{h1} + \frac{1}{3}\rho l_{h1}\right)a_1 + \left(c_{h2} + \frac{1}{3}\rho l_{h2}\right)a_2 & -c_{s1}b_1 + c_{s2}b_2 - c_{s3}b_1 + c_{s4}b_2 & \left(c_{h1} + \frac{1}{3}\rho l_{h1}\right)a_1^2 + \left(c_{h2} + \frac{1}{3}\rho l_{h2}\right)a_2^2 + b_1^2 c_{s1} + b_2^2 c_{s2} + b_1^2 c_{s3} + b_2^2 c_{s4} \end{bmatrix},$$

$$K = \begin{bmatrix} k_{h1} + k_{h2} & 0 & -k_{h1}a_1 + k_{h2}a_2 \\ 0 & k_{s1} + k_{s2} + k_{s3} + k_{s4} & -k_{s1}b_1 + k_{s2}b_2 - k_{s3}b_1 + k_{s4}b_2 \\ -k_{h1}a_1 + k_{h2}a_2 & -k_{s1}b_1 + k_{s2}b_2 - k_{s3}b_1 + k_{s4}b_2 & k_{h1}a_1^2 + k_{h2}a_2^2 + b_1^2 k_{s1} + b_2^2 k_{s2} + b_1^2 k_{s3} + b_2^2 k_{s4} \end{bmatrix}, \text{ and}$$

$$F = \begin{bmatrix} -\frac{1}{6}\rho l_{h1}[\ddot{l}_{r1} + \ddot{u}_1(1+\sin\varphi_1)] - \frac{1}{6}\rho l_{h2}[\ddot{l}_{r2} + \ddot{u}_2(1+\sin\varphi_2)] + \left(-\frac{1}{6}\rho l_{h1} + c_{h1}\right)[\dot{l}_{r1} + \dot{u}_1(1+\sin\varphi_1)] + \\ \left(-\frac{1}{6}\rho l_{h2} + c_{h2}\right)[\dot{l}_{r2} + \dot{u}_2(1+\sin\varphi_2)] + k_{h1}[l_{r1} + u_1(l+\sin\varphi_1)] + k_{h2}[l_{r2} + u_2(1+\sin\varphi_2)] - m_c g - \frac{1}{2}\rho g l_{h1} - \frac{1}{2}\rho g l_{h2} \\ 0 \\ \frac{1}{6}\rho l_{h1}a_1[\ddot{l}_{r1} + \ddot{u}_1(1+\sin\varphi_1)] - \frac{1}{6}\rho l_{h2}a_2[\ddot{l}_{r2} + \ddot{u}_2(1+\sin\varphi_2)] + \left(-\frac{1}{6}\rho l_{h1} + c_{h1}\right)a_1[\dot{l}_{r1} + \dot{u}_1(1+\sin\varphi_1)] - \\ \left(-\frac{1}{6}\rho l_{h2} + c_{h2}\right)a_2[\dot{l}_{r2} + \dot{u}_2(1+\sin\varphi_2)] + k_{h1}a_1[l_{r1} + u_1(l+\sin\varphi_1)] - k_{h2}a_2[l_{r2} + u_2(1+\sin\varphi_2)] + \frac{1}{2}\rho g l_{h1}a_1 - \frac{1}{2}\rho g l_{h2}a_2 \end{bmatrix}.$$

wherein $m_c$ is a mass of the hoisting container, $p$ is unit mass of a steel wire rope, $l_1$ and $l_2$ are respectively a winding length of a duplex winding drum, $l_{c1}$ and $l_{c2}$ are respectively a length of two string ropes in a process of hoisting or descending a hoisting container, $l_{h1}$ and $l_{h2}$ are respectively a length of two vertical section steel wire ropes in the process of hoisting or descending the hoisting container, $u_1$ and $u_2$ are respectively displacement of two floating hoisting sheaves, $\varphi_1$ and $\varphi_2$ are respectively an included angle between the two string ropes and a horizontal plane, $a_1$ and $a_2$ are respectively a horizontal distance between a connecting point of the two vertical section steel wire ropes on the hoisting container and a gravity center of the hoisting container, $b_1$ and $b_2$ are respectively a vertical distance between upper and lower surfaces of the hoisting container and the gravity center of the hoisting container, $k_{h1}$ and $k_{h2}$ are respectively the stiffness of the vertical section steel wire ropes, $c_{h1}$ and $c_{h2}$ are respectively damping coefficients of the vertical section steel wire ropes, g is a gravitational acceleration, $k_{s1}$, $k_{s2}$, $k_{s3}$, and $k_{s4}$ are respectively a transverse equivalent stiffness of four pairs of spring-damping models, $c_{s1}$, $c_{s2}$, $c_{s3}$, and $c_{s4}$ are respectively a transverse equivalent damping coefficient of the four pairs of the spring-damping models, $I_{r1}$ and $I_{r2}$ are respectively a winding length of a duplex winding drum.

2. The hoisting container pose control method of the double-rope winding type ultra-deep vertical shaft hoisting system according to claim 1, wherein in the modeling process of the hoisting subsystem, if it is assumed that no offset load condition exists, i.e., $a_1=a_2$, and when the anticlockwise rotation angle of the hoisting container is 0, the tension of two steel wire ropes is consistent; and therefore, the mathematical model of the double-rope winding type ultra-deep vertical shaft hoisting subsystem is simplified as:

$$(M_{31}\ddot{x}_c + M_{33}\ddot{\theta}) + (C_{31}\dot{x}_c + C_{33}\dot{\theta}) + (K_{31}x_c + K_{33}\theta) = F_{31} \quad (3\text{-}1), \text{ wherein}$$

in the formula, $M_{ij}$, $C_{ij}$, $K_{ij}$ and $F_{ij}$ are respectively elements of the mass matrix, the damping matrix, the stiffness matrix and the non-potential force, i=1,2,3, and j=1,2,3, $x_c$ is the vertical displacement of the gravity center of the hoisting container.

3. The hoisting container pose control method of the double-rope winding type ultra-deep vertical shaft hoisting system according to claim 2, wherein a pose leveling of the hoisting container is regulated by two hydraulic executors, so that $u_1=u=-u_2$, an inclination angle $\theta$ of the hoisting container is a controlled variable, and the mathematical model of the double-rope winding type ultra-deep vertical shaft hoisting subsystem is further simplified as:

$$A\ddot{\theta}+B\dot{\theta}+C\theta=Q\ddot{u}+W\dot{u}+Ru+F_0 \quad (4\text{-}1), \text{ wherein}$$

in the formula (4-1), $$\begin{cases} A = M_{33} \\ B = C_{33} \\ C = K_{33} \\ Q = \frac{1}{6}\rho l_{h1}a_1(1+\sin(\varphi_1)) + \frac{1}{6}\rho l_{h2}a_2(1+\sin(\varphi_2)) \\ W = \left(-\frac{1}{6}\rho l_{h1} + c_{h1}\right)a_1(1+\sin(\varphi_1)) + \left(-\frac{1}{6}\rho l_{h2} + c_{h2}\right)a_1(1+\sin(\varphi_2)) \\ R = k_{h1}a_1(1+\sin(\varphi_1)) + k_{h2}a_2(1+\sin(\varphi_2)) \\ F_0 = \frac{1}{6}\rho l_{h1}a_1 \ddot{l}_{r1} - \frac{1}{6}\rho l_{h2}a_2 \ddot{l}_{r2} + \left(-\frac{1}{6}\rho l_{h1} + c_{h1}\right)a_1 \dot{l}_{r1} - \\ \quad \left(-\frac{1}{6}\rho l_{h2} + c_{h2}\right)a_2 \dot{l}_{r2} + k_{h1}a_1 l_{r1} - k_{h2}a_2 l_{r2} - \\ \quad M_{31}\ddot{x}_c - C_{31}\dot{x}_c - K_{31}x_c + \frac{1}{2}\rho g l_{h1}a_1 - \frac{1}{2}\rho g l_{h2}a_2 \end{cases};$$

$k_{h1}$ and $k_{h2}$ are greater than $c_{h1}$ and $c_{h2}$, so that the formula (4-1) is further simplified as:

$$A\ddot{\theta}+B\dot{\theta}+C\theta=Ru+F_0 \qquad (4\text{-}3)$$

wherein u is a system control input, and $F_0$ is merge results of similar terms.

4. The hoisting container pose control method of the double-rope winding type ultra-deep vertical shaft hoisting system according to claim 3, wherein a state variable is selected to be $x_1=[x_1,x_2]^T=[\theta, \dot{\theta}]^T$, so that a dynamic model of the hoisting subsystem may be converted into a state space form:

$$\begin{cases} \dot{x}_1 = x_2 \\ \dot{x}_2 = -h_1 x_2 - h_2 x_1 + h_3 x_3 + f \end{cases},$$

$y_1=x_1$, wherein
in the formula (5-1), $h_1=B/A$, $h_2=C/A$, $h_3=R/A$, $x_2$ is the differential of x1, x2, $x_3$ are system state variables, and $f=F_0/A$.

5. The hoisting container pose control method of the double-rope winding type ultra-deep vertical shaft hoisting system according to claim 1, wherein the mathematical model of the electrohydraulic servo subsystem in step 2 is as follows:

$$A_p \dot{x}_p + C_{tl}P_L + \frac{V_t}{4\beta_e}\dot{P}_L = Q_L,$$

wherein
in the formula (6-1), $A_p$ is an effective acting area of a hydraulic cylinder piston, $C_{tl}$ is a total leakage coefficient of a hydraulic cylinder, $x_p$ is a displacement of a hydraulic cylinder piston rod, $V_t$ is a total volume of an oil inlet cavity and an oil return cavity of the hydraulic cylinder, $\beta_e$ is an effective volume elasticity modulus of oil liquid in the hydraulic cylinder, $P_L$ is load pressure drop of the hydraulic cylinder, and $Q_L$ is a load flow rate; and
according to the Newton's second law, a load force balance equation of an electrohydraulic servo system is as follows:

$$-m\ddot{x}_p - B_p \dot{x}_p + A_p P_L = F_L \qquad (6\text{-}2),$$

wherein $F_L$ is a force acting on floating hoisting sheaves by the hydraulic cylinder, m is a total mass of the floating hoisting sheaves, and $B_p$ is a viscous damping coefficient of the hydraulic cylinder.

6. The hoisting container pose control method of the double-rope winding type ultra-deep vertical shaft hoisting system according to claim 4, wherein a state variable is selected to be $x_2=[x_3,x_4,x_5]^T=[x_p,\dot{x}_p,P_L]^T$, so that a kinetic model of the electrohydraulic servo subsystem may be converted into a state space form:

$$\begin{cases} \dot{x}_3 = x_4 \\ \dot{x}_4 = a_1 x_5 - a_2 x_4 - a_3 F_g \\ \dot{x}_5 = -a_4 x_4 - a_5 x_5 + a_6 Q_L \end{cases},$$

and
$y_2=x_3$, wherein
in the formula (7-1), $a_1=A_p/m$, $a_2=B_p/m$, $a_3=1/m$, $a_4=4\beta_e A_p/V_t$, $a_5=4\beta_e C_{tl}/V_t$, $x_4$ is the differential of $x_3$, $x_5$ is a load pressure drop of the hydraulic cylinder, $C_{tl}$ is a leakage coefficient, $Q_L$ is a load flow rate, $a_6=4\beta_e/V_t$, $x_p$ is a displacement of a hydraulic cylinder piston rod, $P_L$ is load pressure drop of the hydraulic cylinder, $F_L$ is a force acting on floating hoisting sheaves by the hydraulic cylinder, $Q_L$ is a load flow rate, and $V_t$ is a total volume of an oil inlet cavity and an oil return cavity of the hydraulic cylinder.

7. The hoisting container pose control method of the double-rope winding type ultra-deep vertical shaft hoisting system according to claim 1, wherein a concrete design of outputting the flatness characteristics of the nonlinear system in step 3 is as follows:

$$\dot{x}=f(x,u) \qquad (7\text{-}2), \text{ wherein}$$

in the formula (7-2), x is a system state variable, and u is a system control input with a same dimension as system output y;
if the following system output y exists:

$$y=P(x,\dot{u},\ddot{u},\ldots,u^{(p)}) \qquad (7\text{-}3),$$

the system state variable x and the system control input u may be expressed as equation forms of the system output and finite differential thereof:

$$x=P(y,\dot{y},\ddot{y},\ldots,y^{(q)}) \qquad (7\text{-}4), \text{ and}$$

$$U=Q(y,\dot{y},\ddot{y},\ldots,y^{(q+1)}) \qquad (7\text{-}5)$$

wherein P is a control variable matrix Q is a control output matrix.

8. The hoisting container pose control method of the double-rope winding type ultra-deep vertical shaft hoisting system according to claim 1, wherein a concrete design of the post leveling flatness controller of the double-rope winding type ultra deep vertical shaft hoisting subsystem in step 4 is as follows:

$$\begin{cases} x_{1d} = y_{1d} \\ x_{2d} = \dot{y}_{1d} \\ u_{hd} = (h_1 \dot{y}_{1d} + h_2 y_{1d} - f + \dot{x}_{2d})/h_3 \\ z_1 = x_{1d} - x_1 \\ z_2 = x_{2d} - x_2 \\ u_h = u_{hd} + \frac{1}{h_3}K_1 z_1 \end{cases}.$$

wherein $x_{1d}$ is an expected state variable, $x_{2d}$ is an expected state variable, $u_{hd}$ is system open-loop input, $y_{1d}$ is system expected output, $y_{2d}$ is system expected output, f is $F_0/A$, $h_3$ is the merge results of similar terms, $z_1$ and $z_2$ are system tracking errors, $u_h$ is control output, and $K_1$ is control parameter of the flatness controller.

9. The hoisting container pose control method of the double-rope winding type ultra-deep vertical shaft hoisting system according to claim 1, wherein a design of the position closed-loop flatness controller of the electrohydraulic servo subsystem in step 5 is as follows:

$$\begin{cases} x_{3d} = y_{2d} \\ x_{4d} = \dot{y}_{2d} \\ x_{5d} = \dfrac{1}{a_6}(\ddot{y}_{2d} + a_4 \dot{y}_{2d} + a_5 y_{2d} - a_3 F_g) \\ u_{Ld} = \dfrac{1}{a_6}(a_4 x_{4d} + a_5 x_{5d} + \dot{x}_{5d}) \\ z_3 = x_{3d} - x_3 \\ z_4 = x_{4d} - x_4 \\ z_5 = x_{5d} - x_5 \\ u_L = u_{Ld} + \dfrac{1}{a_6} K_2 z_2 \end{cases}$$

wherein $x_{3d}$, $x_{4d}$ and $x_{5d}$ are expected state variables, $y_{2d}$ is system expected output, $u_{Ld}$ is system open-loop input, $x_4$ is the differential of $x_3$, $x_5$ is a load pressure drop of the hydraulic cylinder, $Z_3$, $Z_4$, $Z_5$ are system tracking errors, $u_L$ is system control input, $K_2$ is proper control gain matrix, $z_2$ is system tracking error, $a_6 = 4\beta_e C_{tl}/V_t$, $\beta_e$ is an effective volume elasticity modulus of oil liquid in the hydraulic cylinder, $C_{tl}$ is a leakage coefficient, and $V_t$ is a total volume of an oil inlet cavity and an oil return cavity of the hydraulic cylinder.

\* \* \* \* \*